US006719356B2

(12) United States Patent
Cleland et al.

(10) Patent No.: US 6,719,356 B2
(45) Date of Patent: Apr. 13, 2004

(54) POWERED OPENING MECHANISM AND CONTROL SYSTEM

(75) Inventors: Terry P. Cleland, Brampton (CA); Larry J. Ferriman, Campbellville (CA); Klaus K. Bytzek, Schomberg (CA); Gary Spicer, Mississauga (CA)

(73) Assignee: Litens Automotive, Woodbridge (CA)

( * ) Notice: Subject to any disclaimer, the term of this patent is extended or adjusted under 35 U.S.C. 154(b) by 0 days.

(21) Appl. No.: 10/131,599

(22) Filed: Apr. 25, 2002

(65) Prior Publication Data

US 2003/0030299 A1 Feb. 13, 2003

Related U.S. Application Data

(60) Provisional application No. 60/286,354, filed on Apr. 26, 2001, provisional application No. 60/304,743, filed on Jul. 13, 2001, and provisional application No. 60/335,799, filed on Dec. 5, 2001.

(51) Int. Cl.[7] .................................................. B60J 5/10
(52) U.S. Cl. ...................................... 296/146.8; 49/339
(58) Field of Search ......................... 296/146.8; 49/339, 49/340, 341

(56) References Cited

U.S. PATENT DOCUMENTS

| | | |
|---|---|---|
| 3,059,962 A | 10/1962 | Harms et al. |
| 3,157,429 A | 11/1964 | Harms et al. |
| 3,713,472 A | 1/1973 | Dozois |

(List continued on next page.)

FOREIGN PATENT DOCUMENTS

| | | | |
|---|---|---|---|
| DE | 197 58 130 | | 9/1998 |
| DE | 197 54 167 | | 6/1999 |
| DE | 198 01 274 | | 7/1999 |
| DE | 198 10 315 | | 9/1999 |
| EP | 0 808 982 | A2 | 11/1997 |
| EP | 0 267 876 | A2 | 5/1998 |
| EP | 0 982 458 | | 3/2000 |
| GB | 2 307 758 | | 6/1997 |
| GB | 2 340 878 | | 3/2000 |
| JP | 54-36223 | | 3/1979 |
| JP | 63-142176 | | 6/1988 |
| JP | 63-142178 | | 6/1988 |
| JP | 64-29014 | | 2/1989 |
| JP | 1-145224 | | 6/1989 |
| JP | 5-141147 | | 6/1993 |
| JP | 5-155253 | | 6/1993 |
| JP | 5-280250 | | 10/1993 |
| JP | 5-125866 | | 8/1994 |
| JP | 10-227323 | | 8/1998 |

OTHER PUBLICATIONS

Joe Gilbert, Technical Advances in Hall–Effect Sensing, Apr., 2001, Allegro Microsystems, (www.sensorland.com/HowPage014.html).*

*Primary Examiner*—D. Glenn Dayoan
*Assistant Examiner*—Patricia L. Engle
(74) *Attorney, Agent, or Firm*—Pillsbury Winthrop LLP

(57) ABSTRACT

A power-operated system for actuating the rear doors or liftgates of motor vehicles includes a strut assembly having two struts, each strut mounted on one side of the door between the door and the vehicle's door frame. One end of each strut is connected to a powered rotating arm. To open the door, the rotating arms change the angular orientation of the struts such that they have a substantial mechanical advantage. In this position, the force provided by the struts overcomes the weight bias of the door, thus opening the door. To close the door, the rotating arms change the angular orientation of the struts such that the struts have a decreased mechanical advantage, reducing the force provided by the struts, and therefore causing the door to fall closed under its own weight bias. A control system for controlling the power-operated system is also disclosed.

28 Claims, 25 Drawing Sheets

U.S. PATENT DOCUMENTS

| | | | | | |
|---|---|---|---|---|---|
| 4,333,269 | A | | 6/1982 | Bascou | |
| 4,903,435 | A | | 2/1990 | Bittmann et al. | |
| 4,952,080 | A | | 8/1990 | Boiucaner et al. | |
| 5,147,106 | A | | 9/1992 | Bartelt et al. | |
| 5,448,856 | A | | 9/1995 | Moore et al. | |
| 5,531,498 | A | | 7/1996 | Kowall | |
| 5,563,483 | A | | 10/1996 | Kowall et al. | |
| 5,588,258 | A | | 12/1996 | Wright et al. | |
| 5,851,049 | A | * | 12/1998 | Squire et al. ............ | 296/146.4 |
| 5,851,050 | A | * | 12/1998 | Squire et al. ............ | 296/146.4 |
| 5,921,604 | A | * | 7/1999 | Yu et al. ....................... | 296/56 |
| 5,982,126 | A | | 11/1999 | Hellinga et al. | |
| 6,055,775 | A | | 5/2000 | Dering et al. | |
| 6,055,776 | A | | 5/2000 | Dettling et al. | |
| 6,092,338 | A | | 7/2000 | Crowner et al. | |
| 6,182,952 | B1 | | 2/2001 | Gutierrez | |
| 6,202,350 | B1 | | 3/2001 | Montgomery et al. | |
| 6,270,149 | B1 | | 8/2001 | Fukumoto et al. | |
| 6,276,743 | B1 | | 8/2001 | Jyawook et al. | |
| 6,298,604 | B1 | * | 10/2001 | Rogers, Jr. et al. ........... | 49/340 |

* cited by examiner

POWERED OPENING MECHANISM AND CONTROL SYSTEM

CROSS-REFERENCE TO RELATED APPLICATIONS

Priority is claimed to co-pending U.S. Provisional Patent Application No. 60/286,354, filed Apr. 26, 2001, No. 60/304,743, filed Jul. 13, 2001, and No. 60/335,799, filed Dec. 5, 2001. The disclosure of U.S. Provisional Application No. 60/335,799 is incorporated by reference herein in its entirety.

FIELD OF THE INVENTION

The present invention relates generally to powered systems for opening and closing closures such as doors and hatches, and more particularly, to powered systems for opening and closing motor vehicle closures.

BACKGROUND ART

Motor vehicle liftgates and deck lids act to close and seal the rear cargo area of a motor vehicle. Typically, these closures or closure structures are mounted in a frame located at the rear of the vehicle, usually on a horizontally extending axis provided by a hinge. The liftgate is thus positioned to rotate between a closed position adjacent to the frame and an open position, in which the cargo area of the motor vehicle is accessible. The liftgate or deck lid itself is often very heavy, and because of its mounting, it must be moved against gravity in order to reach the open position. Because of the liftgate's weight, it would be a great burden if a user was required to lift the liftgate into the open position and then manually hold it in place in order to access the vehicle's cargo area.

In order to make it easier to open liftgates and deck lids, most modem motor vehicles use gas or spring-loaded cylindrical struts to assist the user in opening and holding open liftgates and deck lids. The struts typically provide enough force to take over the opening of the liftgate after the liftgate has been manually opened to a partially opened position at which the spring force and moment arm provided by the struts are sufficient to overcome the weight of the liftgate, and to then hold the liftgate in an open position.

Usually, a motor vehicle liftgate-assist system consists of two struts. The two struts in a typical liftgate assembly are each pivotally mounted at opposite ends thereof, one end pivotally mounted on the liftgate and the other end pivotally mounted on the frame or body of the motor vehicle. Each strut's mounting point is fixed, and the strut thus possesses a fixed amount of mechanical advantage in facilitating the manual opening process. In addition, because the force provided by the struts is constant, the user must thrust downward on the liftgate and impart sufficient momentum to the liftgate to overcome the strut forces in order to close the liftgate.

Automated powered systems to open and close vehicle liftgates are known in the art. However, these systems typically use a power actuator to apply a force directly to the liftgate to enable opening and closing thereof. For example, U.S. Pat. No. 5,531,498 to Kowall discloses a typical liftgate-opening system in which the gas struts are actuated by a pair of cables which are, in turn, wound and unwound from a spool by an electric motor. Because this typical type of powered system acts as a direct replacement for the user-supplied force, it provides relatively little mechanical advantage from its mounted position, typically requires a significant amount of power to operate, and is usually large, requiring a significant amount of space in the tailgate area of the vehicle, which is undesirable.

Control systems for the typical powered liftgate systems are also available. Such control systems usually include at least some form of obstacle detection, to enable the liftgate to stop opening or closing if an obstacle is encountered. These obstacle detection systems are usually based on feedback control of either the force applied by the liftgate or actuator motor or the speed at which the liftgate or motor is moving. One such control system for the type of cable-driven liftgate actuator described above is disclosed in U.K. Patent Application No. GB 2307758A. In general, the control system of this reference is designed to control the movement of the liftgate based on the measured liftgate force, using an adaptive algorithm to "learn" the liftgate system's force requirements. However, the movement of a liftgate is a complex, non-linear movement and existing control systems are usually adapted only for conventional "brute force" powered liftgate systems.

Other prior art power liftgate systems are more passive. For example, DE 198 10 315 A1 discloses an arrangement in which the angular position of a strut is changed in order to facilitate opening and closing of a deck lid. However, the structural configuration of the disclosed design is such that it permits a very limited range of closure movement and limited mechanical advantage in the different positions. In addition, among numerous other disadvantages, the device disclosed in DE 198 10 315 A1 does not provide a controlled system that enables dynamic control of the closure during movement thereof. This reference also does not contemplate use of the closure in manual mode, among other things.

DE 197 58 130 C2 proposes another system for automated closure of a deck lid. As with the '315 reference, the '130 reference does not contemplate or allow dynamic control over the deck lid, use of the deck lid in manual mode, and does not enable a power driven closing force to be applied to the lid. Moreover, both of the '130 and '315 references disclose very large structural arrangements, making packaging in a vehicle very difficult.

SUMMARY OF THE INVENTION

One aspect of the present invention relates to a powered closure drive mechanism for a vehicle. The powered closure drive mechanism includes a strut that is mountable between a frame of a vehicle and a closure pivotally connected to the frame. The strut has opposite ends moveable in opposite directions and is biased to move the opposite ends toward and away from one another. The angular orientation of the strut is adjustable between angular orientations in which the bias of the strut overcomes the weight of the closure so as to move the closure in a closure opening direction and angular orientations in which the weight of the closure overcomes the bias of the strut so as to move the closure in a closure closing direction. A motor assembly is operatively coupled with the strut so as to adjust the angular orientation of the strut and thereby effect opening and closing of the closure. A dynamic property detector is also included in the mechanism to detect a dynamic property of the closure. A controller is operably connected with the motor and the dynamic property detector. The motor adjusts the angular orientation of the strut based on information received from the dynamic property detector so as to maintain closure velocity within predetermined velocity limits.

In this aspect of the invention, the dynamic property detector may comprise, for example, an inclinometer carried by the closure, or an encoder operatively connected with the hinge on which the closure is mounted. More generally, the dynamic property detector may be any type of velocity detector. The mechanism may also include a strut orientation detector that sends a signal to the controller based on the orientation of the strut. The strut orientation detector may be, for example, a Hall Effect sensor operatively associated with the motor.

Another aspect of the invention relates to a powered closure drive mechanism for a vehicle. Using this mechanism, the strut assumes a first orientation when the closure is fully opened and a second orientation when the closure is fully closed. A pivot point of the strut is moved by the motor when effecting opening and closing movement of the closure and is disposed in a same manual mode position when the strut is in either of the first and second orientations, enabling manual opening and closing of the closure.

A further aspect of the present invention relates to a powered closure drive system mounted to the rearward-most pillar of a vehicle frame. A motor is operatively coupled with the strut so as to adjust the angular orientation of the strut and thereby facilitate opening and closing of the closure. An arm is connected to the motor and one end of the strut. A controller is operatively connected with the motor to control operation of the motor.

According to this aspect of the invention, the motor may be mounted within the rearward-most pillar so as to provide a shaft extending into the longitudinal channel for connection with the arm. Alternatively, the motor may provide a shaft extending into the longitudinal channel for connection with the arm. The system may also include a panel constructed and adapted to cover the motor. The panel would be disposed on an interior portion of the vehicle.

Yet another aspect of the invention relates to a powered closure drive system for a vehicle. Using this mechanism, the strut assumes a first orientation when the closure is fully opened and a second orientation when the closure is fully closed. When the closure approaches the fully closed position, the strut has an angular orientation such that a line of action of the strut causes a closing force to be applied to the closure.

Another aspect of the invention provides to a powered closure drive system for a vehicle. Using this mechanism, the strut assumes a first orientation when the closure is fully opened and a second orientation when the closure is fully closed. During a movement from the first orientation toward the second orientation, the motor is moved such that the second end of the strut is positioned outwardly of a line of action defined between a hinge pivot axis of the closure and the pivotal strut connection with the closure at the first end of the strut so as to apply a closing force to the closure.

According to this aspect of the invention, the powered closure drive system also includes an arm having a first connecting structure adapted for connection to the first end of the strut and a second connecting structure adapted for connection to the output shaft of the motor. Additionally, an inclination detector is mounted on the closure and is capable of detecting the inclination of the vehicle when the closure is closed. The inclination detector is connected with the controller to enable the motor to adjust the orientation of the strut based on the inclination of the strut, the vehicle, or the strut and the vehicle. According to this aspect, the inclination detector may also detect the inclination of the closure when the closure is moving.

An additional aspect of the invention relates to a rear vehicle assembly of a motor vehicle having a powered closure drive system.

Another aspect of the present invention relates to an automated, pivoted closure system.

An additional aspect of the invention relates to a method for controlling an automated, pivoted closure. The method comprises providing a fixed structure, a pivotal structure mounted for pivotal movement about a horizontal axis, and a biased strut connected between the fixed structure and the pivotal structure, measuring a dynamic property of a closure as it moves under the influence of the bias of the strut and the gravitational forces of its weight, and controlling a motor to change an angular orientation of a strut relative to the horizontal axis based upon a desired dynamic property of the closure so as to maintain the closure within a desired dynamic property profile. The dynamic property may be selected from the group consisting of closure position, closure velocity, closure acceleration.

DETAILED DESCRIPTION

The present invention will be described below particularly with respect to its application in the rear liftgates of automobiles. However, those skilled in the art will realize that the present invention may be applied to other types of vehicle closures and also to closures that are not mounted on vehicles. For example, the present invention may find application in trunk lids for automobiles, panel covers for light trucks, train doors, bus doors, and household closures like windows and doors.

Figure 1:
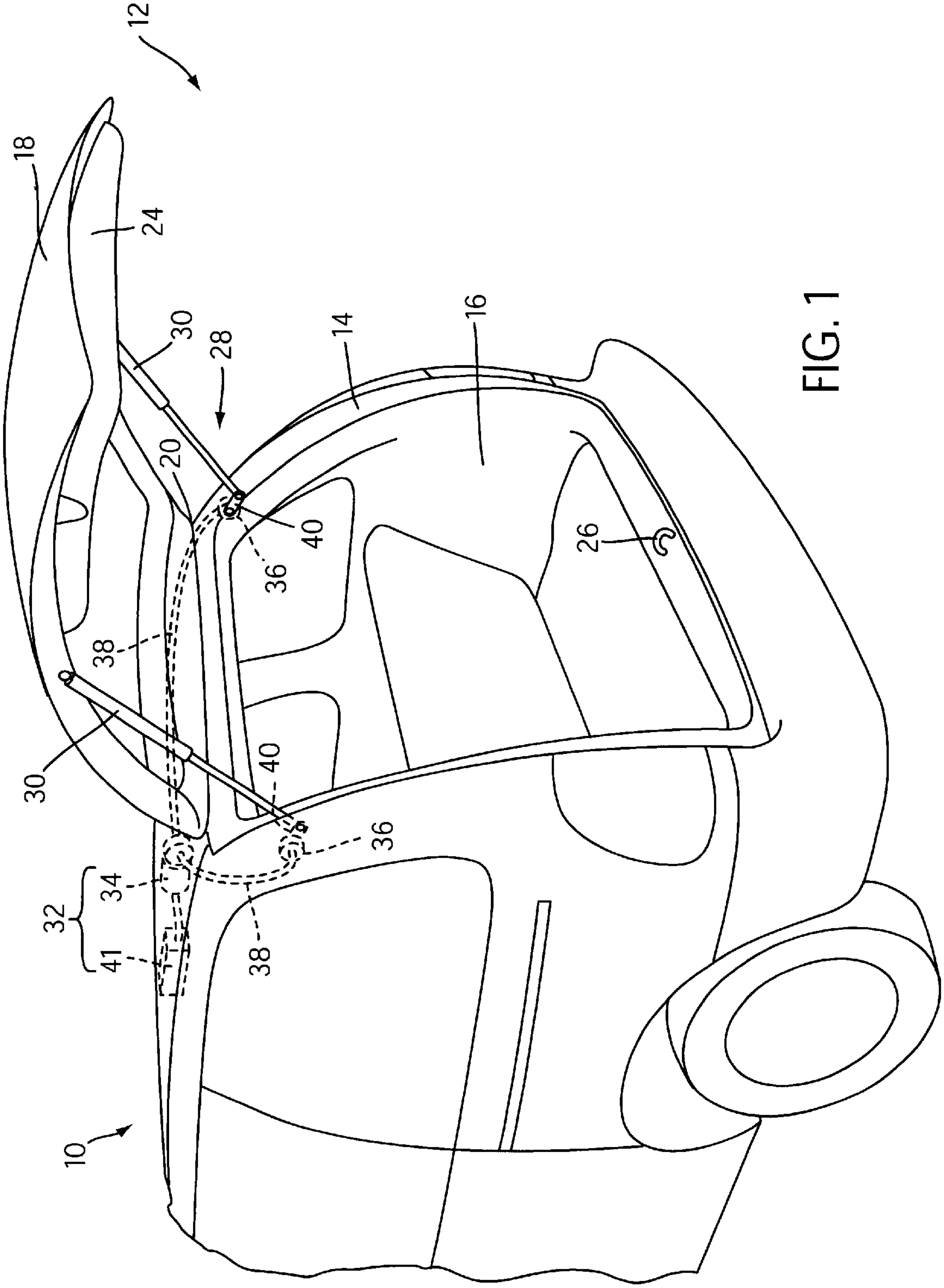
FIG. 1 is a perspective view of an automobile with a rear vehicle assembly according to the present invention.

Referring now more particularly to the drawings, there is shown in FIG. 1 thereof an automobile, generally indicated at 10, with a rear assembly, indicated at 12, embodying the principles of the present invention. The rear assembly 12 consists of a vehicle body or frame 14 which defines an opening 16 at the rear of the automobile 10. A rear liftgate or door 18 (or more generally referred to as a "closure") is constructed and arranged to fit in closed relation within the door opening 16. The weight of the door 18 biases it towards the closed position within the door opening 16.

A hinge assembly 20 is connected between an upper portion of the frame 14 and an upper portion of the door 18, mounting the door 18 for movement in an upward direction opposed to the weight bias of the door 18. The hinge assembly 20 provides a generally horizontally extending hinge axis of movement for all positions of the door 18.

A latch assembly 22 having cooperating parts mounted on the door 18 and the frame 14 is also shown in FIG. 1. The latch assembly 22 is provided for releasably locking the door 18 in a closed position after the door 18 has been moved through a range of movement adjacent to or into the closed position.

The latch assembly 22 includes a latch 24 disposed within the lower portion of the door 18, and a complimentary latch striker 26 disposed within the lower portion of the frame 14. The latch 24 and latch striker 26 are constructed and arranged to be interengaged in locking relation, and may be a powered latch assembly or an unpowered latch assembly as known in the art. In the case of a powered latch assembly, the latch assembly may "cinch" the door into sealing relation with a peripheral door seal carried by the door itself or by the door frame. In other words, the door 18 need only move to a position adjacent the fully closed and sealed position, at which point the powered latch assembly functions to pull the door into the fully closed position, against the resiliency of the peripheral seal structure for the door 18.

The assembly 12 also includes a strut assembly 28 with opposite ends movable in opposite directions toward and away from each other. In the illustrated embodiment, the strut assembly includes two struts 30, one strut 30 mounted on each side of the assembly 12 between the door 18 and the vehicle body or frame 14. It will be appreciated by one of skill in the art that the strut assembly 28 may include only a single strut 30 connected between the door 18 and vehicle body or frame 14. In other words, while two struts 30 are preferred, the function required for the strut assembly 28 can be accomplished with just a single strut 30. Although gas struts 30 are preferred for most automotive embodiments of the present invention, it should be understood that any structural member capable of storing mechanical energy (i.e., a "resilient stored-energy member") may be used with the present invention (e.g., metal springs, elastic polymers), and considered as a "strut" for the purposes of this disclosure. The particular choice of resilient stored-energy member depends on the weight of the door 18, the desired movement rate of the strut assembly 28, and other conventional mechanical and structural considerations.

Figure 2:
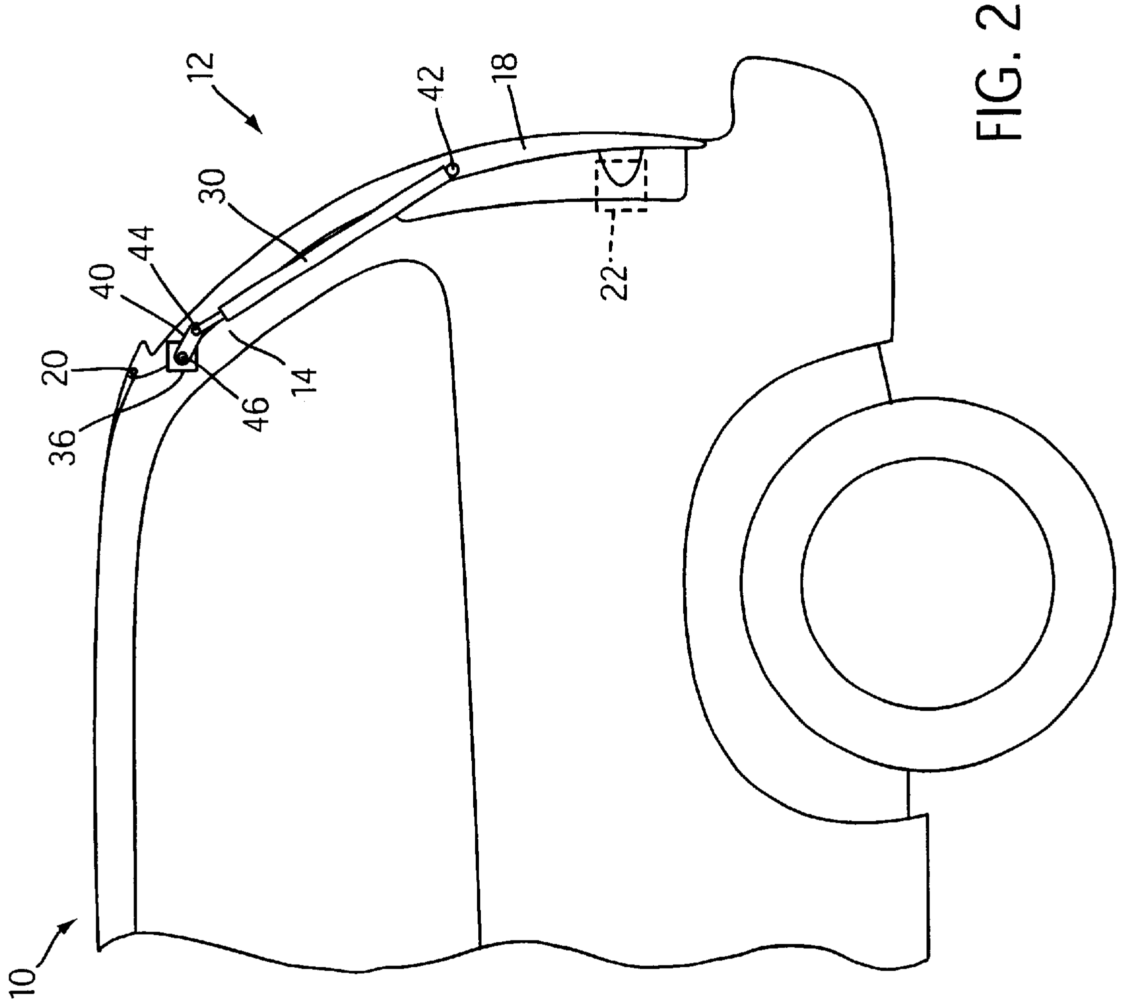
FIG. 2 is a left side elevational view of the automobile of FIG. 1 in schematic form (it being understood that the strut assembly is located within the vehicle body), showing the rear door in a closed position.

As shown in FIG. 2, the strut 30 and a rotating arm 40 rotate about two generally horizontally extending pivotal axes, at which standard strut bolts, or other fasteners as known in the art, are installed. A first pivotal axis 42 is defined by the connection point between the door 18 and a first end of the strut 30. In the embodiments shown in the Figures, the "first end" of the strut connected to the door 18 is the cylinder end of the strut, although it can be appreciated that the strut can be oppositely mounted so that the piston end is mounted to the door 18. A second strut axis 44 is defined at the connection between the second end (piston end in the figures) of the strut 30 and the rotating arm 40. An arm axis 46 or third pivotal axis is defined by the connection between the rotating arm 40 and a gearbox 36 that receives the output of a motor 34. The connection between the gearbox 36 and motor 34 will be described in greater detail below.

In this embodiment, the gearbox 36 is attached within the vehicle body or frame 14. Although not preferred, it is anticipated that the gearbox 36 and rotating arm 40 could be mounted to the door 18, with the connection of the strut 30 at pivot axis 42 being connected within the vehicle body, to perform the same function.

The strut assembly 28 is constructed and arranged to overcome the weight bias of the door 18 and move the door in a direction toward the open position thereof when the struts 30 are oriented in door-raising relation. The strut assembly 28 is also constructed and arranged to be overcome by the weight bias of the door 18 and allow the door 18 to move in an opposite direction toward the closed position thereof when the struts 30 are oriented in door-lowering relation as described below.

As shown in FIG. 1, the struts 30 of the strut assembly 28 are moved between door-raising relation and door-lowering relation by a power operated system, generally indicated at 32. In this embodiment, the power operated system 32 includes a single drive motor 34 and an electronic control system 41 disposed within the roof of the automobile 10 (as shown with dotted lines in FIG. 1). The drive motor 34 communicates power to the two gearboxes 36, disposed respectively on opposite sides of the vehicle, by means of two flexible rotation-transmitting shafts 38, each shaft 38 connecting between the motor 34 and a respective gearbox 36 as shown. The power operated system 32 changes the articulation point 44 of the struts 30 by means of the two strut-positioning rotating arms 40 which connect associated gearboxes 36 with respective ends of the struts 30 as shown. The power operated system 32 can be any electromechanical structure that is operatively connected with at least one of the struts 30 and that is capable of moving the strut so as to change the geometric relation of the strut between the door and vehicle body to favor the opening and/or closing operation. In the present disclosure, the drive motor 34, gearbox 36 and arm 40 may be considered as part of the power operated system 32.

In the rear assembly 12, the door 18 can be moved automatically between the closed position and the open position as will be described in greater detail below. However, the power operated system 32 does not directly drive the door 18 the full distance between the closed position and the open position. Rather, the power operated system 32 simply positions the pivot points (e.g., articulation point 44) of the struts 30 so that the spring bias of the struts is in itself sufficient to overcome the weight of the door 18 and move the door 18 to the opened position from the closed position. Similarly, when the door is opened, it can be moved to the closed position simply by moving the pivot point 44 at one end of the struts 30 so that the weight of the door 18 overcomes the internal spring force provided by the struts 30. Thus, the movement of the door 18 between two positions is passive in the sense that power operated system 32 merely moves the articulation (i.e., attachment) points of the two struts 30, so as to change the angular orientation of the struts 30 and thereby provide the struts 30 with either more or less mechanical advantage. It is the change in the mechanical advantage of the struts 30, and the resulting change in the effective force exerted by the struts 30, that actually causes the door 18 to move in one direction or the other. Because the powered operated system 32 does not directly drive the door 18 through its range of travel, in the event that the door 18 meets an obstacle during its movement, the obstacle will only encounter the spring force from the struts 30 and not a direct driving force from the motor 34. Otherwise put, there is lost motion permitted by virtue of the spring action of the struts 30 when an obstacle interferes with door movement. It should also be noted that the spring force of the struts 30 is closely balanced by the weight of the door 18 during travel. The slight imbalance in forces causes movement of the door 18 in either direction. Therefore, in the event that the door 18 impacts an obstacle during opening or closing, the force exerted on that object by the door 18 will be only a small fraction of the weight of the door 18.

As noted above, as the struts 30 are moved into a position of greater mechanical advantage, their effective force increases and the struts 30 are able to overcome the weight of the door 18, pushing the door 18 towards the open position. The speed of opening can be regulated by the position of arm 40. Similarly, as the struts 30 are moved into a position of lesser mechanical advantage, their effective force decreases and they are no longer able to support the door 18, which allows the door 18 to automatically close under its own weight, with the closing speed regulated by the position and angular orientation of the struts 30. Specifically, the closing speed of the door 18 is regulated by changing the angular orientation of the struts 30 with respect to the vehicle frame 14 and door 18 through computer-controlled movement of arm 40. This actuation sequence and control system will be described in greater detail below.

In one embodiment, the single drive motor 34 supplies power to the rotating arms 40 to move the two struts 30 in a generally coincidental movement. The gearboxes 36 are provided to reduce the rotational speed of the drive motor 34 to an appropriate speed for moving the struts 30. It is anticipated that the reduction provided by the gearboxes 36 may also be provided by a plurality of gears disposed at several locations within the power operated system 32. For example, a portion of the necessary reduction in motor speed could be accomplished by a small gearbox attached to the motor 34, while additional reduction could be performed by smaller gearboxes attached to the flexible shafts 38.

Alternatively, the coincidental motion of the two struts 30 (i.e., the coincidental motion of the two rotating arms 40) could be produced by two drive motors 34, each drive motor 34 connected to a gearbox 36, as will be described below with respect to FIGS. 23–25. If two motors are used, sensor input is provided on the position of both motors 34 and both struts 30, so as to coordinate their movement.

In a further embodiment of the present invention, two drive motors may be used to move the struts 30 in a non-coincidental movement. Although coincidental or synchronized movement of the two struts 30 is advantageous in that it avoids placing torsional stresses on the door 18, the rotating arms 40, and the other components, independent articulation of the two struts 30 provides several advantages. For example, independent, non-coincidental movement of the struts 30 allows two different types of struts 30 to be installed, to include various capabilities that cannot be easily packaged into a single strut. An example would be the use of a coil spring inside one of the struts (the other strut being a purely gas strut) in order to kick-start the door opening process during cold weather conditions where gas struts are less effective. As another example, one of the struts may include a temperature compensating valve body as known in the strut art, while the other strut is a less expensive ordinary gas strut.

Figure 10A:
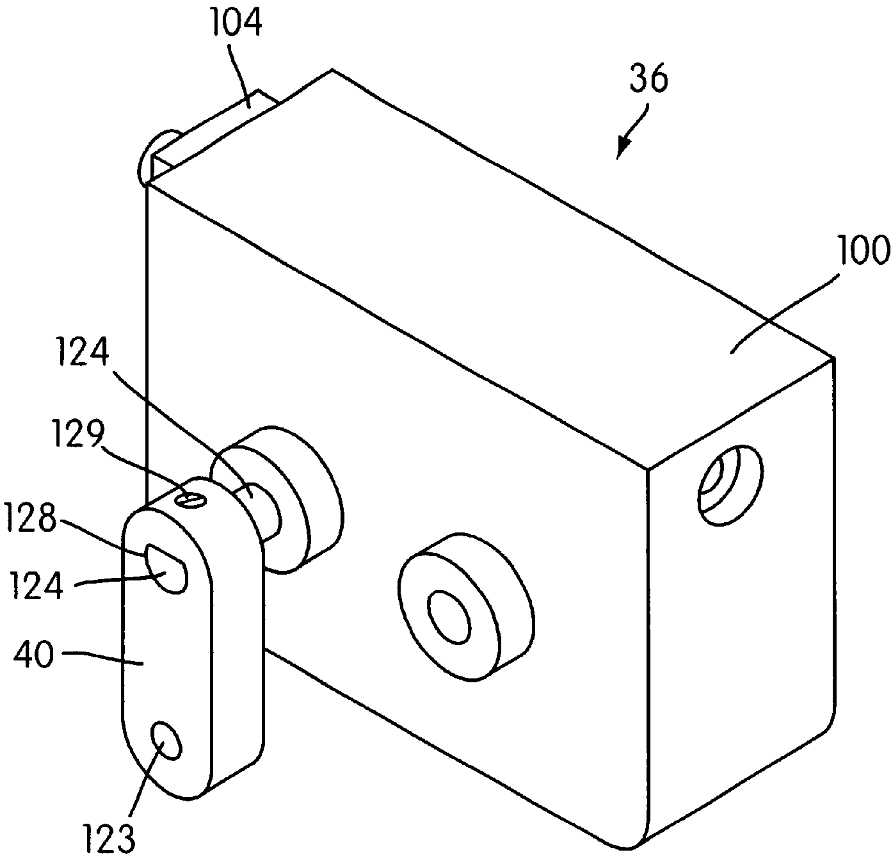
FIGS. 10A–B are perspective and exploded views, respectively, of a gearbox according to the present invention.
Figure 10B:
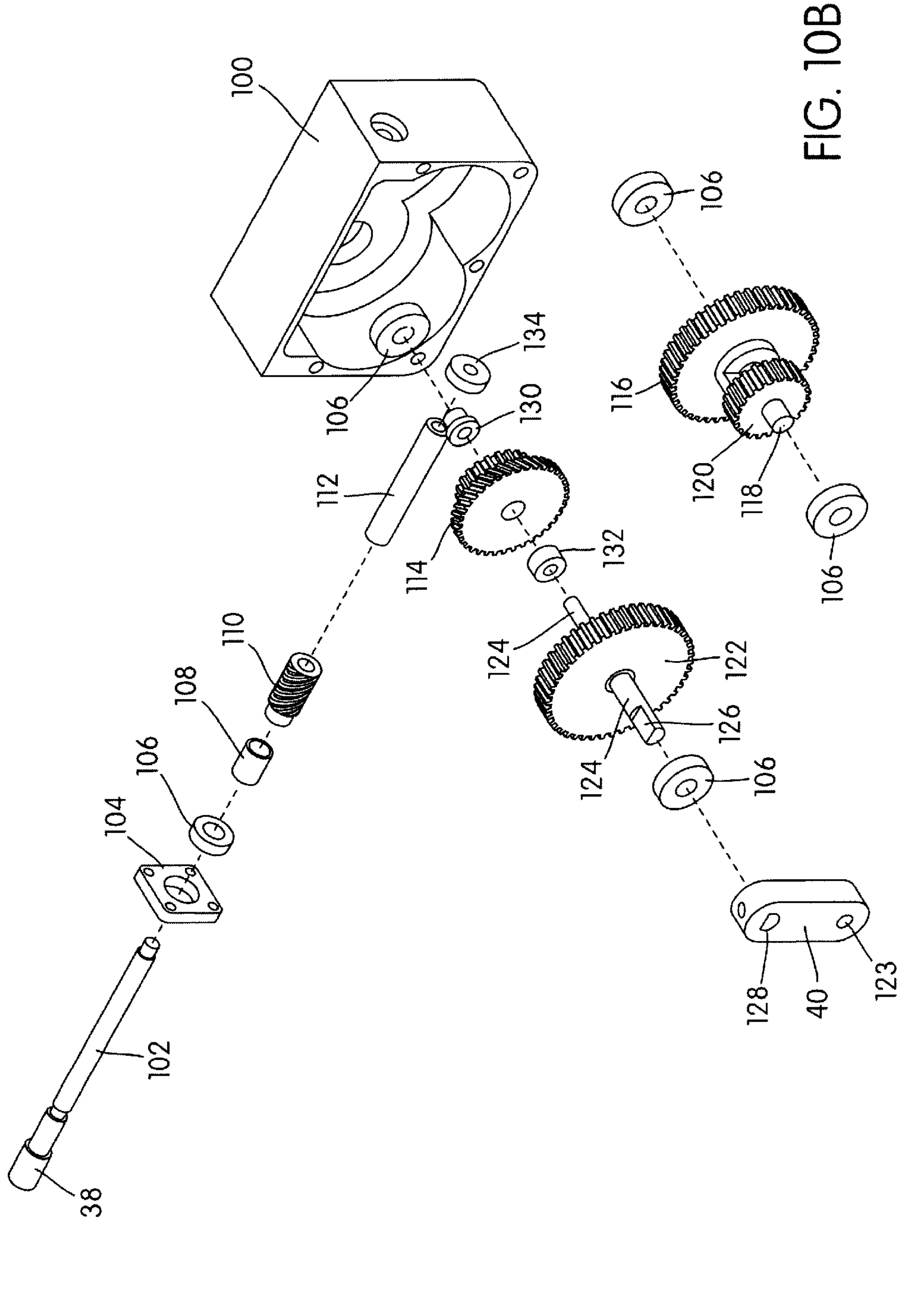

FIG. 10A is a perspective view of the gearbox 36 and the rotating arm 40 mounted thereon. FIG. 10B is an exploded view of the gearbox 36. As shown in FIGS. 10A and 10B, the gearbox 36 has a housing 100 in which the gearing components fit. The flexible shaft 38 enters the housing 100 from the left (as shown in the figure), terminating in a worm shaft portion 102. The flexible shaft 38/102 passes through a bearing plate 104, and rests on a bearing 106 thereof. The shaft 38/102 passes through a short bushing 108, a worm 110, and a long bushing 112.

In this exemplary arrangement of the gearbox 36, the worm shaft portion 102 is in mechanical driving communication with worm 110. The worm 110 drives a worm engaging gear 114, which in turn drives a spur gear 116 that is mounted on a gear box compound shaft 118. Also mounted on the compound shaft 118 is a spur gear 120, which is of smaller diameter than spur gear 116. The spur gear 120 is connected to and moves coincidentally with the spur gear 116, driving another spur gear 122 that is mounted on a main shaft 124. The communication and motion of the gears 114, 116, 120, 122 provides the desired reduction in drive motor 34.

As shown in FIG. 10B, the main shaft 124, the shaft that communicates with the rotating arm 40, passes through a bearing 106. The main shaft 124 includes a keyed portion 126, and the rotating arm 40 has a hole 128 corresponding to the keyed portion 126. The rotating arm 40 is mounted onto the main shaft 124, engaging the keyed portion 126, and is secured to the keyed portion 126 of the main shaft 124 with a set-screw or other fastener 129 (the fastener 129 is best seen in FIG. 10A). Various spacers 130, bearings 132, and bushings 134 complete the gear assembly of the gearbox 36.

Figure 23:
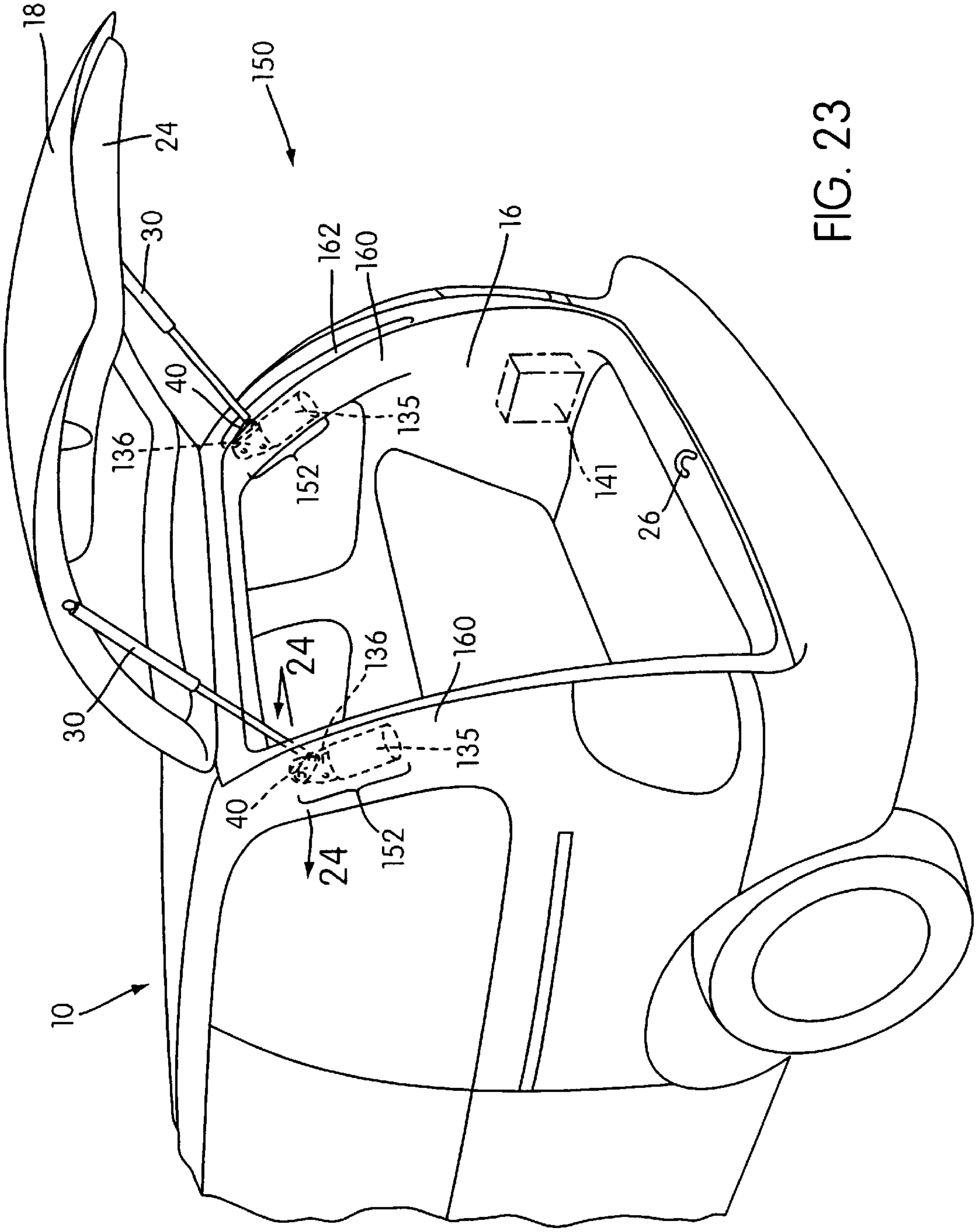
FIG. 23 is a perspective view of an automobile with another embodiment of a rear vehicle assembly according to the present invention.

Another embodiment of the invention is illustrated in FIG. 23, a rear perspective view of an automobile 10 having a rear assembly 150. The rear assembly 150 is substantially similar to the rear assembly 12 illustrated in FIG. 1. However, the power operated system 152 of the rear assembly 150 uses two drive motors 135 to drive the struts 30, one drive motor 135 coupled to each of the struts 30. Specifically, the drive motors 135 of the illustrated embodiment connect to reducing gearboxes 136, each of which provides a rotatable shaft that is connected to an associated one of the rotating arms 40, as described above. The movement of the two struts 30 produced by the two drive motors 135 may or may not be coincidental and/or synchronized in nature, although in the following disclosure, it will be assumed that the movement is coincidental and synchronized. Therefore, the movement sequence of the door 18 of this embodiment is as shown and described with respect to FIGS. 2–9.

The embodiments illustrated in FIGS. 1 and 23 function in essentially the same way, although the embodiment illustrated in FIG. 23 may have certain advantages with respect to certain automobiles. As described above, the "packaging" (i.e., installation process and space requirements) of a power operated system 32, 152 are considerations in its design. It is generally desirable that the components of the power operated system 32, 152 be installed in easily accessible locations such that relatively little modification to the automobile 10 is necessary in order to install the power operated system 32. For example, in FIG. 1, the power operated system 32 is installed in the roof of the vehicle, and it is assumed that space is available in that location. However, if space is not available to install the power operated system 32 in the roof of the vehicle, the arrangement of the power operated system 152 shown in FIG. 23 may be used.

In rear assembly 150 shown in FIG. 23, the power operated systems 152, including the motors 135 and gearboxes 136, are installed in the rearward-most pillar 160 of the vehicle 10. The rearward-most pillar may be, for example, the "D" pillar of the vehicle 10, depending on the particular vehicle 10. In this embodiment, the strut 30 extends from a rearwardly facing longitudinal channel 162 provided in the rearward-most pillar 160 (the right-side longitudinal channel 162 is visible in FIG. 23). The arrangement of the rearward-most pillar 160 and longitudinal channel 162 will be described in more detail with respect to FIGS. 24 and 25.

An advantage of mounting the motor 135 and gearbox 136 within the confines of the rearward-most pillar 160 is that the same vehicle frame can be used for both manual and automatic rear door platforms. Particularly, because the same structure can be used whether the strut 30 is mounted to a rotating arm 40 or a fixed point relative to the rearward-most pillar, the frame structure and interior panels can be the same for both manual liftgate and automatic liftgate versions of the vehicle 10, thus reducing the tooling costs of the vehicle frame and panels.

Figure 24:
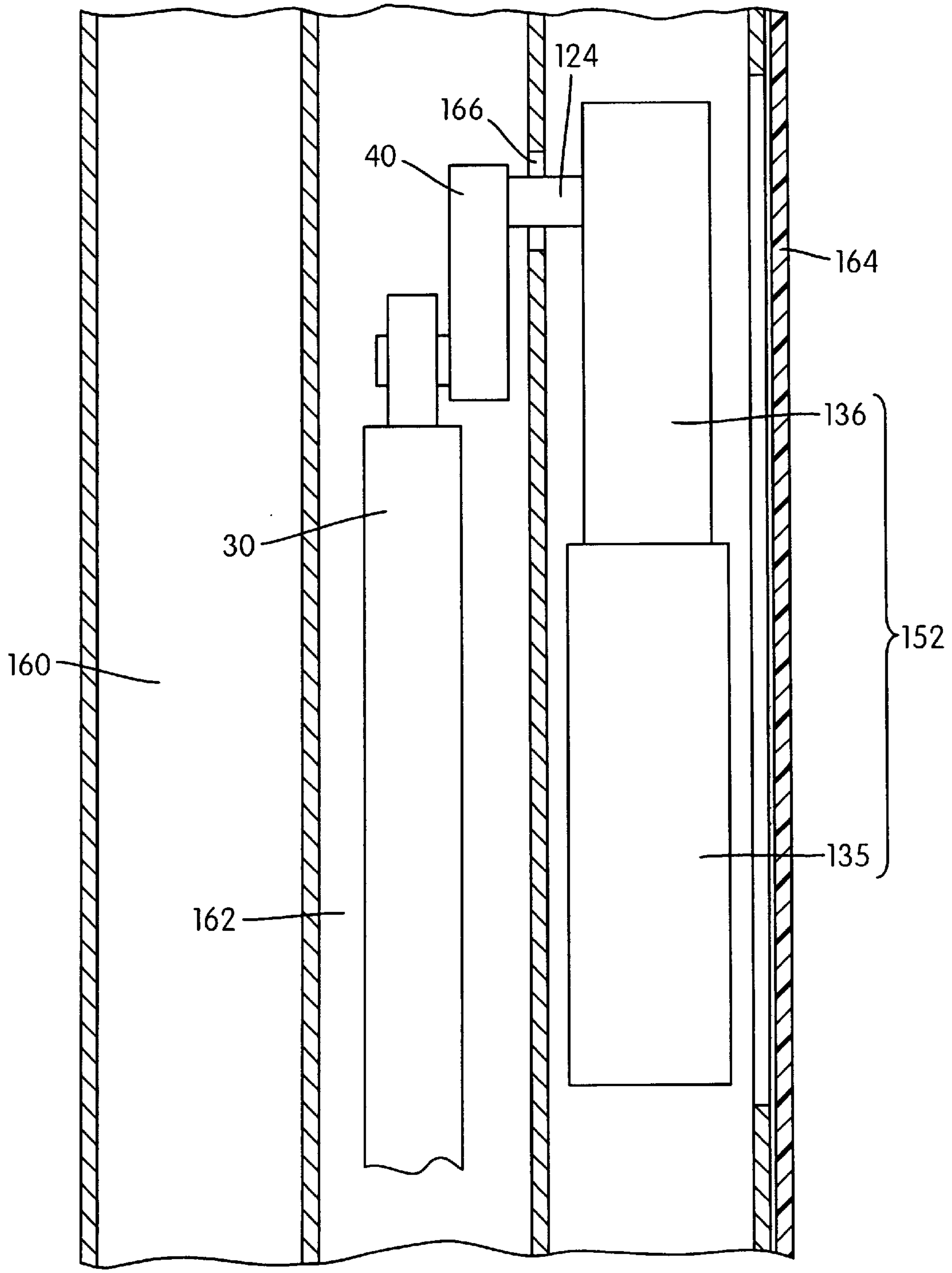
FIG. 24 is a sectional view of one side of the rear assembly of FIG. 23, taken through line 24—24 of FIG. 23.

FIG. 24 is a sectional view of the rearward-most pillar 160, taken through line 24—24 of FIG. 23, illustrating the arrangement of the power operated system 152. As shown, the rearward-most pillar 160 is generally "C-shaped" such that it is provided with a rearwardly facing longitudinal channel 162 that receives at least a portion of the strut 30 and at least a portion of the rotating arm 40 when the door 18 is in the fully closed position. A motor 135 and gearbox 136 are mounted within the confines of the rearward-most pillar 160. The gearbox 136 drives a rotatable shaft 124 that extends through a portion of the pillar 160, shown as hole 166 in FIG. 24, so as to extend into the channel 162 and be connected with the rotatable arm 40. Positioning of the struts 30 at least partially within the channels or recesses formed in the rearward-most pillar 160 when the door 18 is closed is advantageous in packaging and positioning the struts 30. A molded panel 164 covers the rearward-most pillar 160 towards the interior 16 of the vehicle 10.

Figure 25:
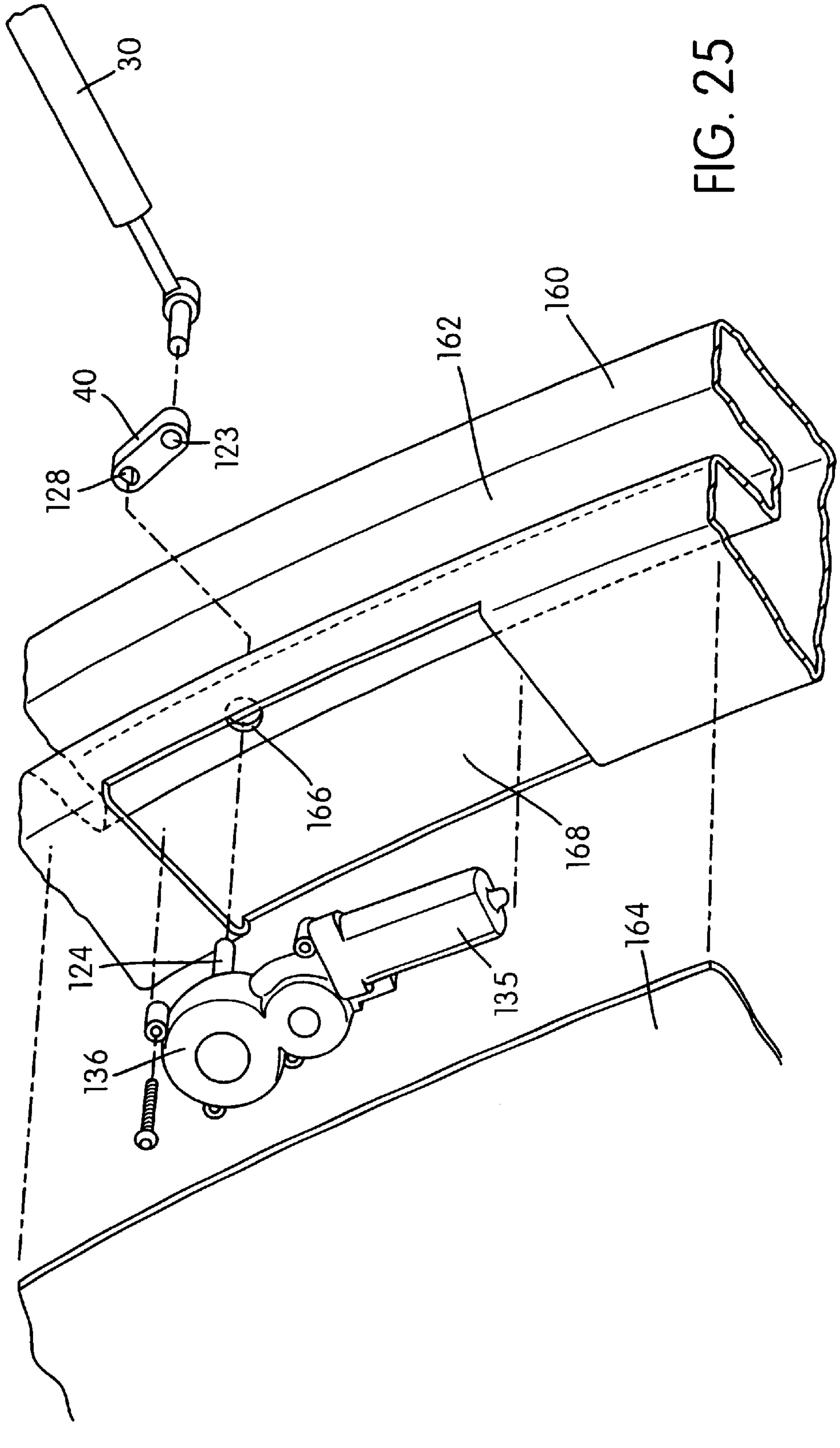
FIG. 25 is an exploded view of the rearward-most pillar of the automobile of FIG. 23 illustrating the installation of a powered system according to the invention.

FIG. 25 is an exploded view of a portion of the rearward-most pillar 160 illustrating the installation of the power operated system 152 within the pillar 160. A lateral face 168 of the pillar 160 is removed to allow for the installation of the power operated system 152, providing an accessway 168 to the interior of the pillar 160. The power operated system 152 is installed within the pillar 160 such that the shaft 124 of the gearbox 136 extends through hole 166. Within the channel 162, the rotating arm 40 provides connecting structure, which in this case is hole 123, for connection to the strut 30 and connecting structure, in this case hole 128, for connection to the shaft 124.

Another aspect of the present invention relates to the relative positioning of the opposite ends of the strut. When the door 18 is closed, a first end (at axis 44) of the strut 30 is mounted to the rearward-most pillar 160 at a relative vertical position or height that is above the second end (at axis 42) of the strut 30 (e.g., see FIG. 2). During the opening of the door 18, under the mechanically advantaged forces discussed herein, the second end of the strut is raised and winds up at a position higher than that of the first end (e.g., see FIGS. 5 and 6).

As noted above, the power operated system 32, 152 includes an electronic control system 41, 141 that is disposed within the automobile 10. The operation of the electronic control system 41, 141 is described later in this specification. It can be appreciated that the electronic control system 41, 141 may also be considered to be a separate component that interfaces or communicates with the drive motor 34, 135 of the power operated system 32, 152.

Operation Sequence of the Strut Assembly

The motion and bias of the strut 30 are better illustrated in FIGS. 2–9, in which the positions of the strut 30 and rotating arm 40 are shown in detail. FIGS. 2–9 illustrate an embodiment in which the movement of the two struts 30 is coincidental. Therefore, although only one side of the rear assembly 12 is shown, it may be assumed that the strut 30 on the other side of the rear assembly 12 is undergoing substantially identical motion. Additionally, although the arrangement of the power operated system 32, 152 differs in the embodiments illustrated in FIGS. 1 and 23, the movements illustrated in FIGS. 2–9 may be carried out in substantially identical fashion by the power operated systems 32, 152 of both embodiments.

In FIG. 2, the door 18 is in a closed position. The strut 30 is in a compressed state. As shown in the Figure, in this "at rest" or "home" position, the opposite pivot axes 42 and 44 of strut 30 and the pivot axis of hinge assembly 20 are co-linear or in alignment with one another. The imaginary line extending between pivot axis 44 of the strut 30 and the pivot axis 46 for the control arm 40 extends at an angle of about 45° to an imaginary vertical line. In this position of the arm 40, when the system is at rest, the strut 30 has minimal or substantially no mechanical advantage for opening the door 18. Therefore, the leveraged weight of the door 18 is much greater than the effective force provided by the struts 30. The struts 30 are compressed by the weight of the door 18 while the door 18 remains in the closed position. Because the weight of the door 18 is much greater than the effective force provided by the struts (in the illustrated position), the door 18 will remain in the closed position for as long as the position/orientation of the struts 30 is unchanged, even if the door 18 is unlatched. That is, while door 18 may be latched and unlatched into and from the closed position by the latch 24 and latch striker 26, the door 18 remains in the closed position irrespective of whether or not it is latched because of the angular orientation of the struts 30. The angular orientation of the struts 30 is determined by the position of the rotating arms 40. In the "at rest" or "home" position shown in FIG. 2, the adjustable pivot axis 44 for the strut is located where a strut pivot axis would be located in a conventional manual strut-mounted rear liftgate, and provides mechanical advantage similar to that of a manual liftgate system. Therefore, while the rotating arm 40 is in the "home" position, the door 18 may be opened entirely in manual mode, without use of the power operated system 32, 152. The axis 44 will be disposed in this same "home" position when the door 18 is filly opened (e.g., see FIG. 6), irrespective of whether the door 18 has been moved to the fully opened position manually, or by operation of the power operated system 32, 152. Thus, when the door 18 is fully opened, the axis 44 will be located where a strut pivot axis would be located for a conventional manual strut-mounted rear liftgate. Therefore, the vehicle door 18 may also be closed entirely in manual mode, without use of the power operated system 32, 152.

To open the door 18 using power operated system 32, 152 the door 18 is unlatched (either automatically or manually) and the rotating arms 40 are moved away from the "home" position illustrated in FIG. 2 to change the mechanical advantage of the struts 30. That is, to open the door 18 after it is unlatched, the rotating arms 40 are moved into a position that geometrically favors a door lifting action for the strut 30, by the pivot axis 44 of each strut 30 being moved such that the struts each have a greater mechanical advantage for door-lifting action and exert a greater effective lifting force or moment arm on the door 18. As the effective exerted force or moment arm of the struts 30 on the door 18 increases, that exerted force/moment arm eventually becomes larger than the downward gravitational force on the door 18. Thus, the compressed air and/or springs within struts 30 begin to uncompress, providing the required energy for pushing the door 18 toward the open position. For purposes of this description, the orientation or positioning of the struts 30 when the angular position of the rotating arms 40 (particularly pivot point 44 thereon for mounting the struts 30) allows the struts 30 enough mechanical advantage to push the door 18 open is herein referred to as the door-raising relation of the strut or struts 30.

Figure 3:
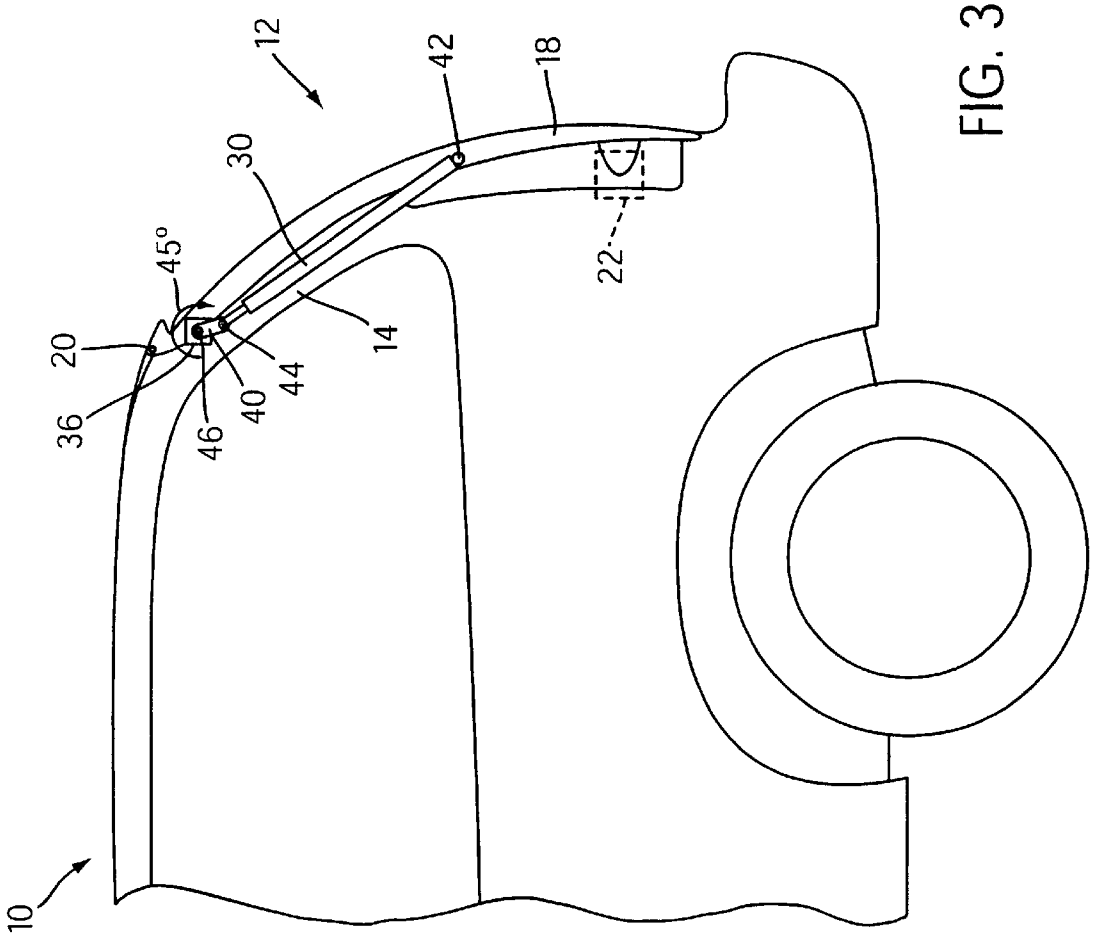
FIG. 3 is a left side elevational view of the automobile of FIG. 1 in schematic form, showing the movement of the strut assembly into door opening relation.

FIG. 3 illustrates the movement of the rotating arm 40 and strut 30 into door-raising relation. To establish the door-raising relation, the rotating arm 40 is rotated in a clockwise direction with respect to the figure, away from the neutral position of FIG. 2. The precise amount of arm rotation that is required to place the strut 30 in door-raising relation varies with the type of automobile 10 in which the system is installed. In one example, the amount of arm 40 rotation is approximately 45 degrees from the neutral or at-rest position.

As the rotating arm 40 is rotated, the position of the pivot axis 44 relative to the pivot axis for hinge assembly 20 provides increasingly greater mechanical advantage or moment arm to the strut 30, and the compressed gas and/or springs within the struts thus provides a force sufficient to overcome the weight bias of the door 18. As the mechanical advantage of the strut 30 is increased, it begins to extend and to push the door 18 open.

Additionally, movement or back and forth cycling of the rotating arms 40 may commence prior to unlatching the door 18 in order to lubricate (or "unstick") the internal works of the piston/cylinder arrangement of the arms 40, and also to provide a "boost" to the initial opening of the door 18, particularly if the vehicle 10 is tilted or inclined. These features will be described in more detail below. Depending on the system and particular operating conditions, the door 18 may also be unlatched prior to any movement of arm 40.

Figure 4:
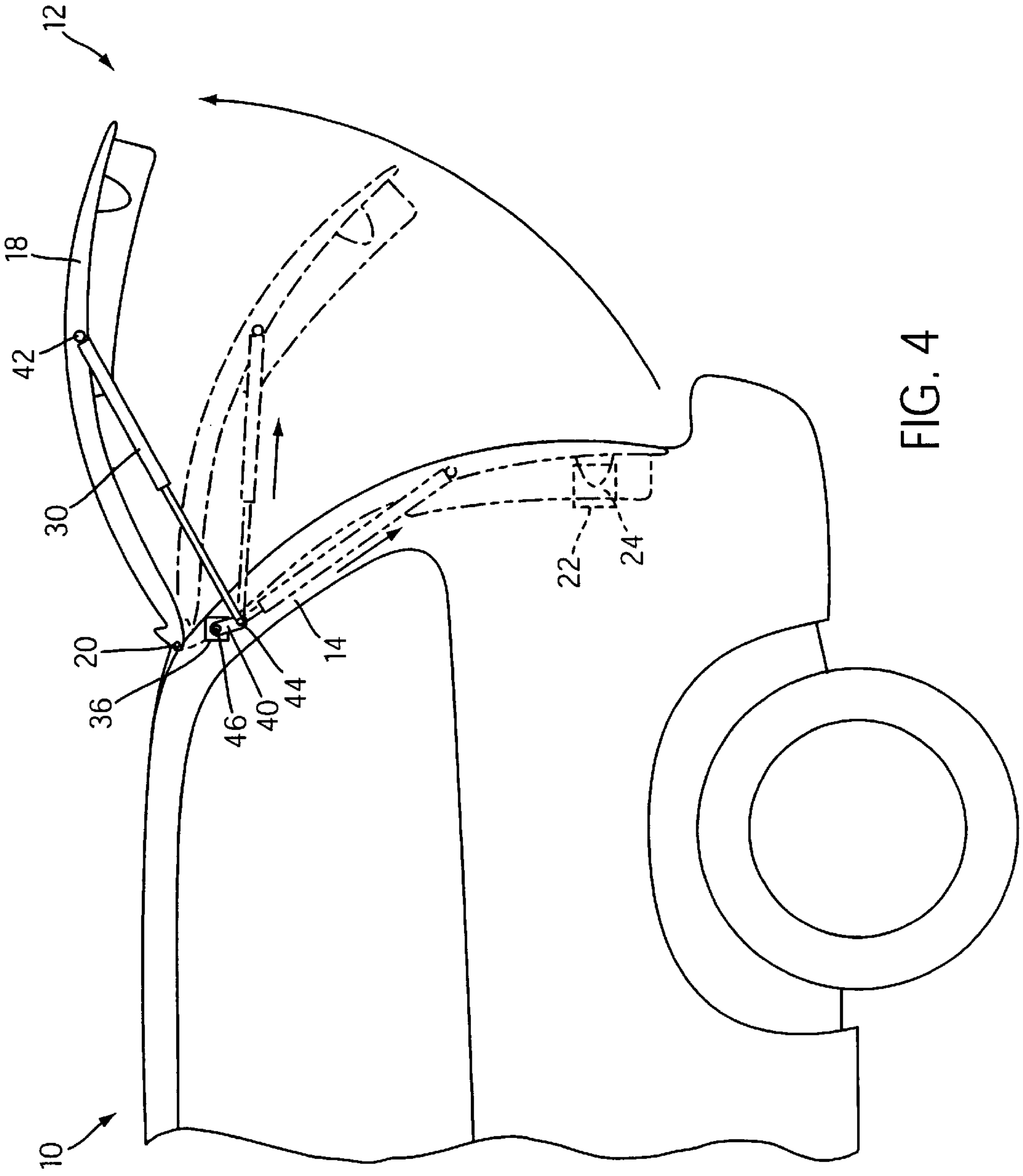
FIG. 4 is a left side elevational view of the automobile of FIG. 1 in schematic form, showing the movement of the door towards the open position.

The rotating arm 40 may initially remain in the position illustrated in FIG. 3 while the strut 30 extends and moves the door 18 towards the open position, as illustrated in FIG. 4. Alternatively, the rotating arm 40 for one or both struts 30 may actively move and include instantaneous periods of stoppage or even instantaneous reverse movement during the initial opening process, depending on the particular geometries involved and feedback received by the controller 41. Feedback control of the power operated system 32, 152 would be based on the door position and/or speed, as may be determined by a door position detector, such as an angular position encoder in the hinge assembly 20 or an inclinometer in the door 18. These devices will be described in more detail below.

Figure 5:
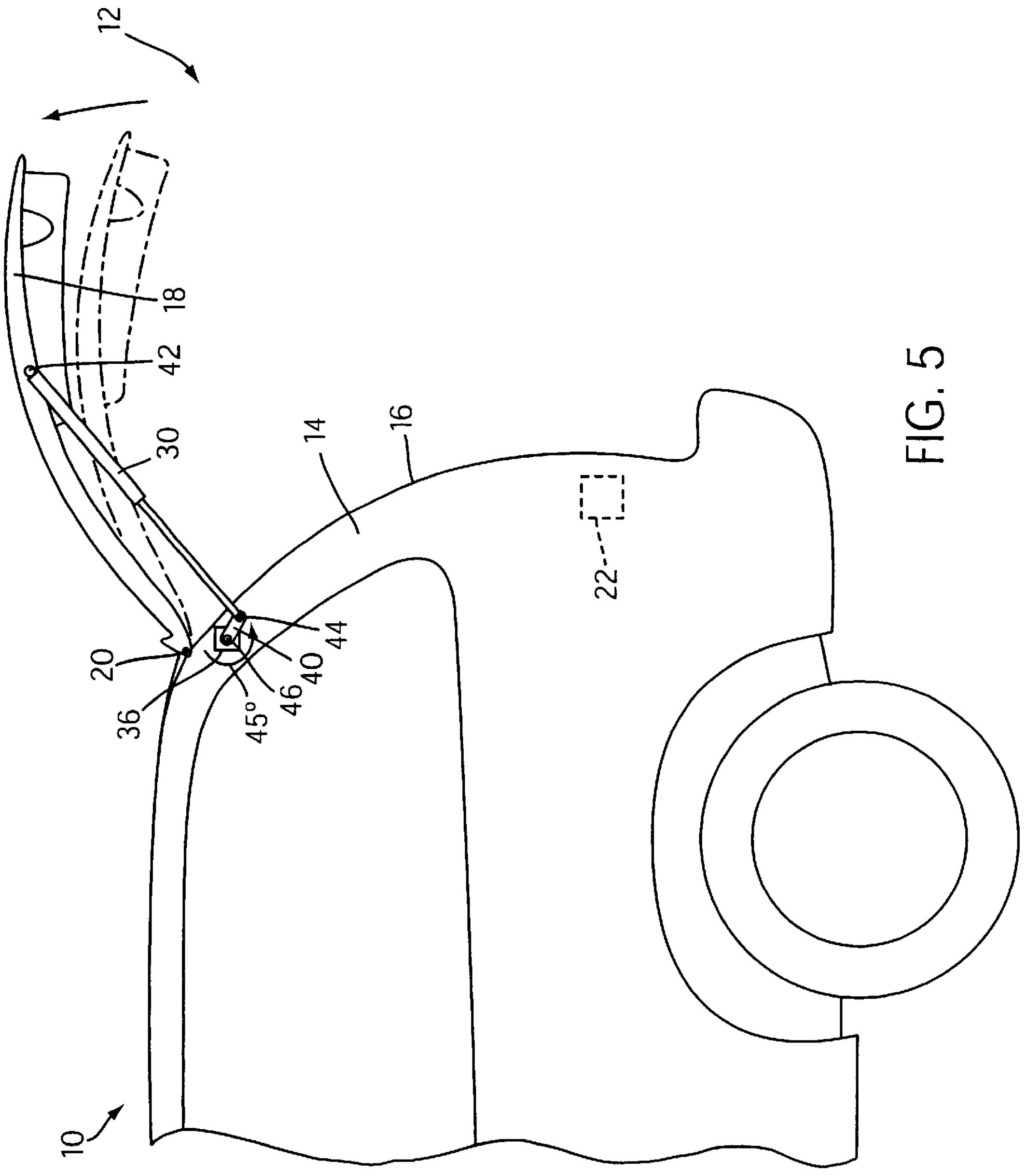
FIG. 5 is a left side elevational view of the automobile of FIG. 1 in schematic form, showing the movement of the door from a partially open position to a fully open position.
Figure 6:
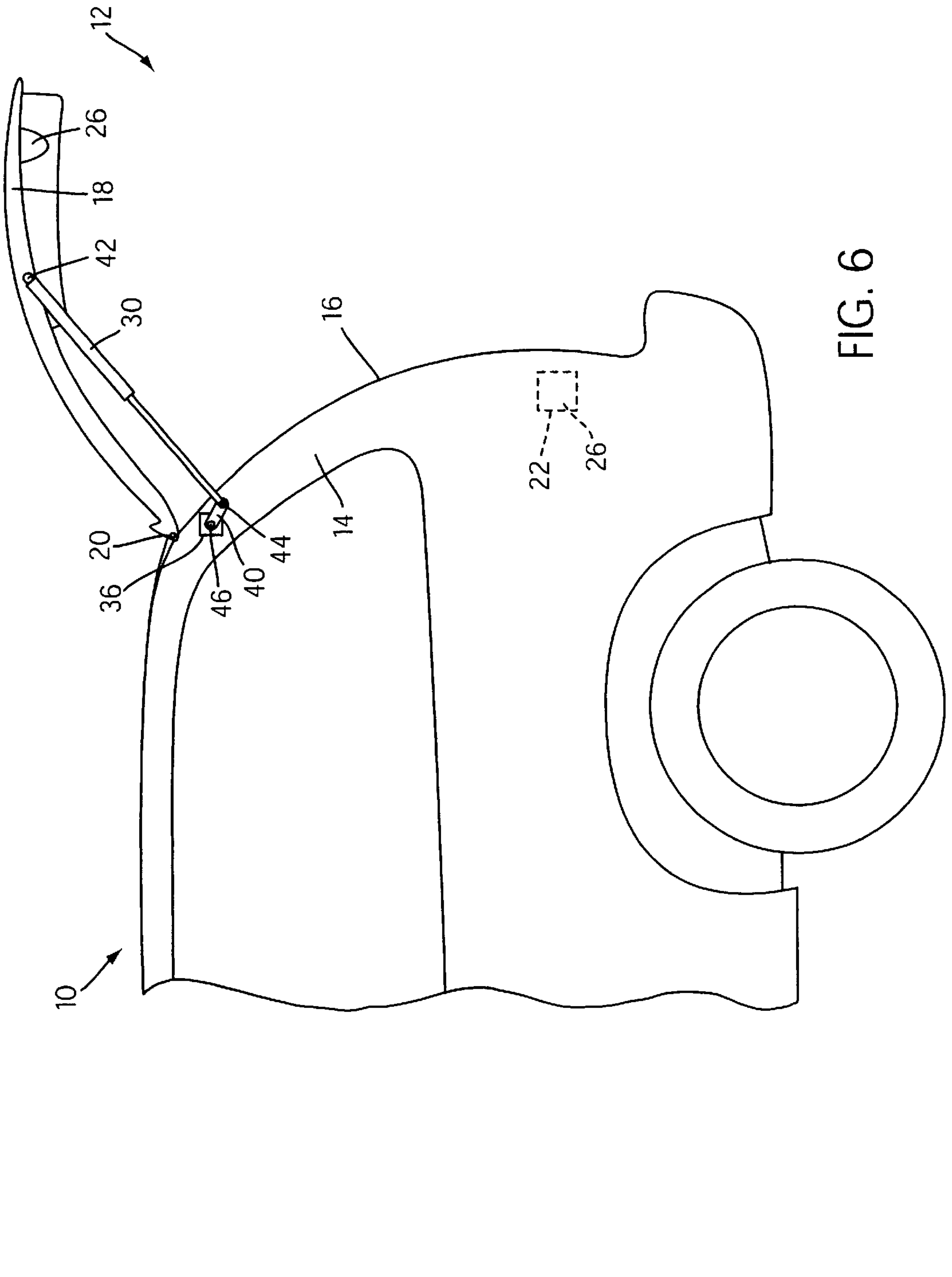
FIG. 6 is a left side elevational view of the automobile of FIG. 1 in schematic form, showing the fully open position of the door structure.

In the position illustrated in FIG. 4, the strut 30 has reached the limit of its extension. To move the door 18 into a fully open position with respect to the frame 14, the rotating arm 40 is moved back toward the original "home" position of FIG. 2 by a rotation of the arm 40 in a counter-clockwise direction with respect to the figure to push the door 18 through the final portion of travel. This movement is illustrated in FIG. 5. The fully open position of the door 18, with the strut 30 fully extended, is illustrated in FIG. 6.

Figure 7:
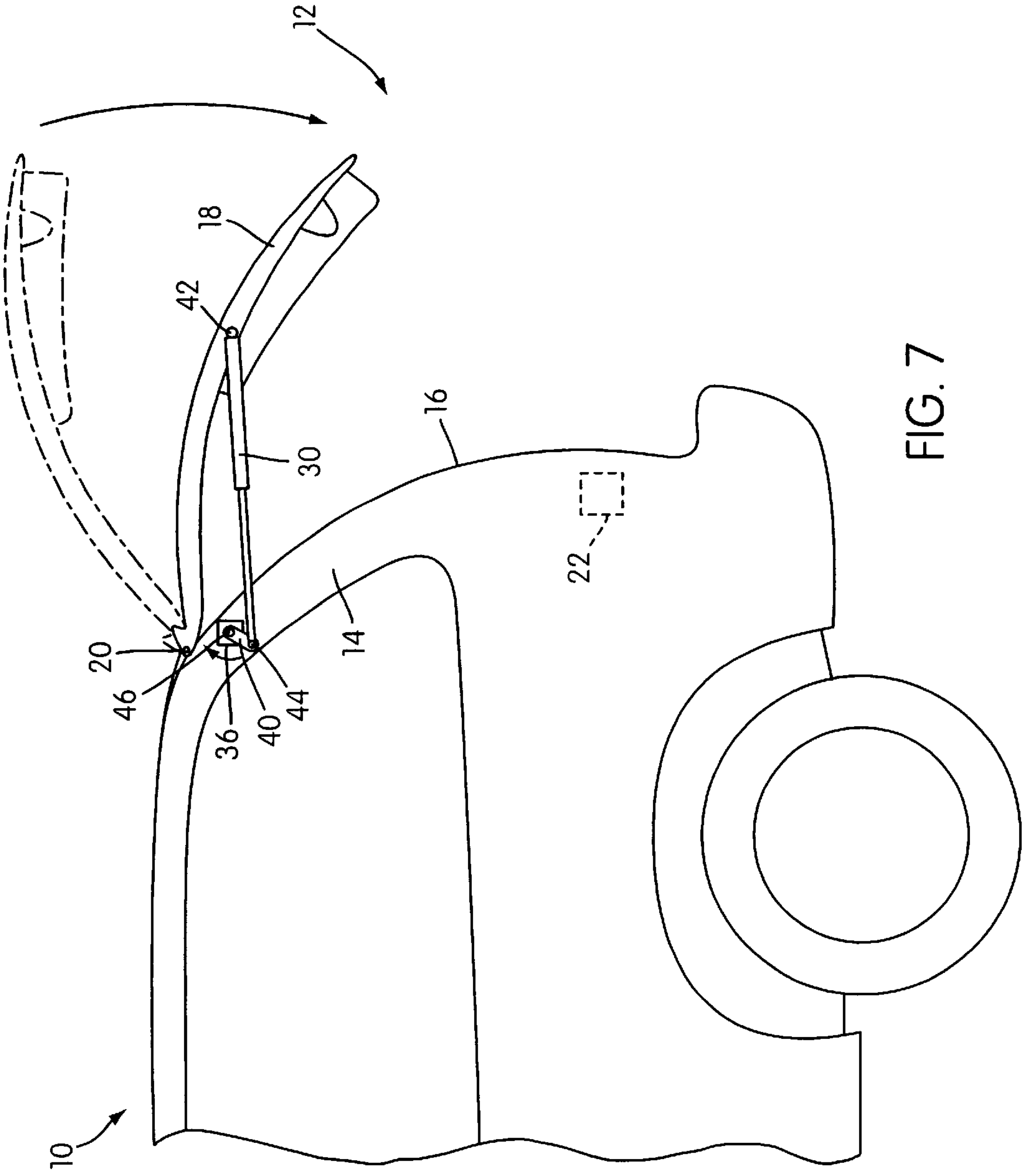
FIG. 7 is a left side elevational view of the automobile of FIG. 1 in schematic form, showing the movement of the door towards a closed position.

In FIG. 7, the first steps of the door-closing process are illustrated. The strut 30 is moved into an initial door-closing relation by clockwise rotation (e.g., 45°) of the rotating arm 40 with respect to the figure. In this position, the position of pivot axis 44 relative to the hinge assembly 20 axis is such that the mechanical advantage or moment arm of the strut 30 is eroded, and the force provided by the strut 30 is overcome by the gravitational force acting on the door 18. The orientation or positioning of the struts 30 when the angular position of the rotating arm 40 reduces the mechanical advantage or moment arm of the struts 30 relative to the door 18 so that the weight of the door moves the door 18 towards the closed position is referred to as the door-lowering relation of the strut or struts 30. To establish the door-lowering relation, the rotating arm 40 is rotated so that it reaches a position that is, for example, 180-degrees displaced from the neutral or "home" position, as illustrated in FIG. 8.

Figure 8:
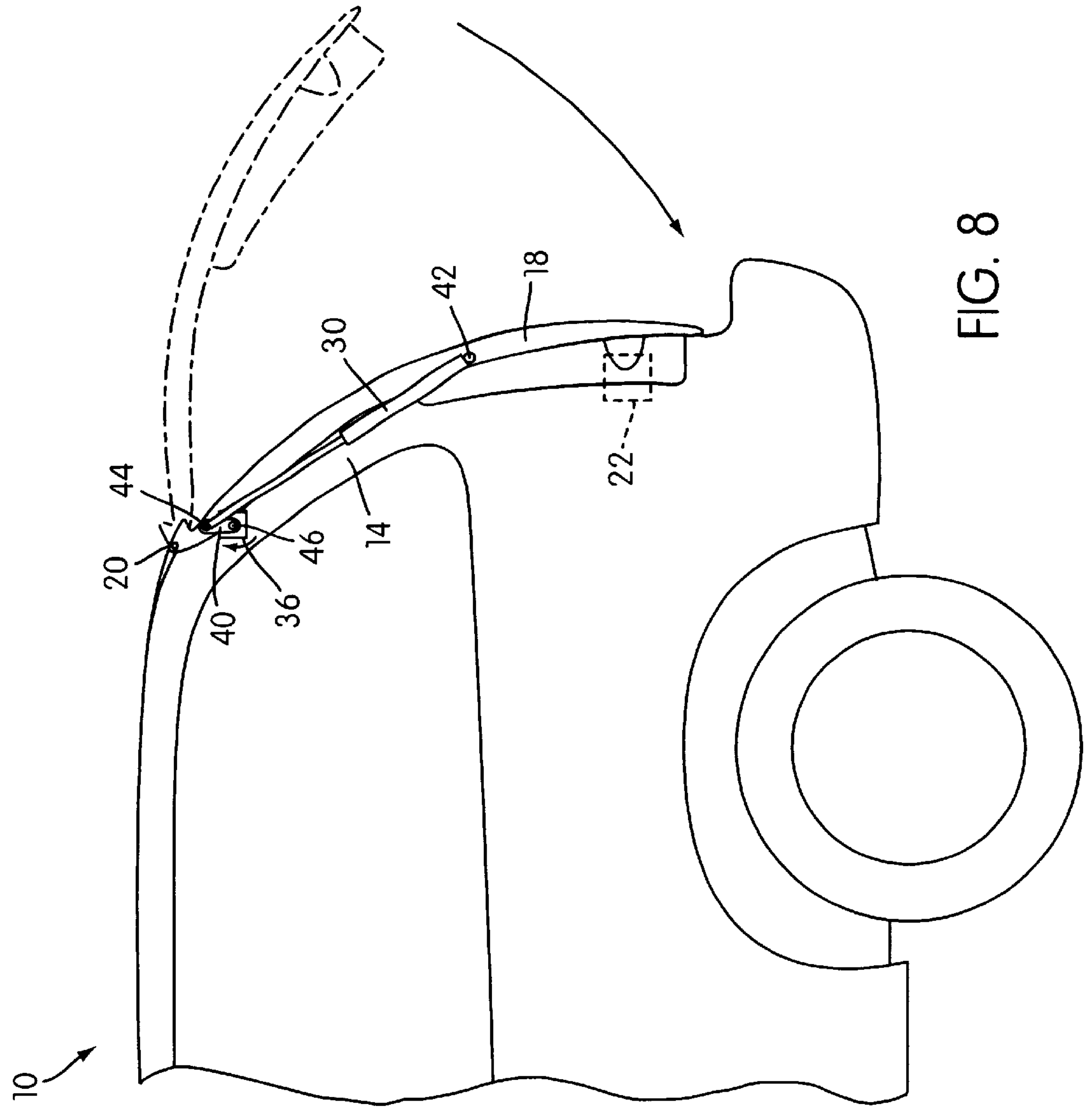
FIG. 8 is a left side elevational view of the automobile of FIG. 1 in schematic form, showing the movement of the door from a partially closed position towards a fully closed position.

Once the rotating arm 40 has reached the position illustrated in FIG. 8 (axes 20, 44, and 42 being aligned), the strut 30 has substantially no mechanical advantage, and the door 18 moves into a closed or near closed position, falling under its own weight. One of skill in the art will appreciate that when the weight of the door 18 overcomes the force provided by the struts 30, the door 18 may fall very quickly into the closed position if the door closing action is uncontrolled. This type of quick door movement is generally undesirable, as it provides little time to clear obstacles that may be present in the path of the door. Likewise, if the ascent of the door 18 is too quick, similar problems may arise. Small movements or oscillations of the arm 40 may be used to control movement of the door 18 to prevent such rapid door movements.

Preferably, the movement of the door 18 is controlled by the electronic control unit 41, 141 and power operated system 32, 152 and, if two noncoincidentally-moving struts are used, by the noncoincidental or asynchronous motion of the struts 30, to produce smooth, controlled door motion, preferably at a substantially constant velocity for most of the doors path of travel. Smooth, controlled door motion is also desirable for commercial reasons, as the performance of a rear assembly 12 in which door velocity is carefully controlled may exceed that of a conventional powered system, while using far less energy. Additional control techniques of door 18 will be discussed in greater detail later.

Figure 9:
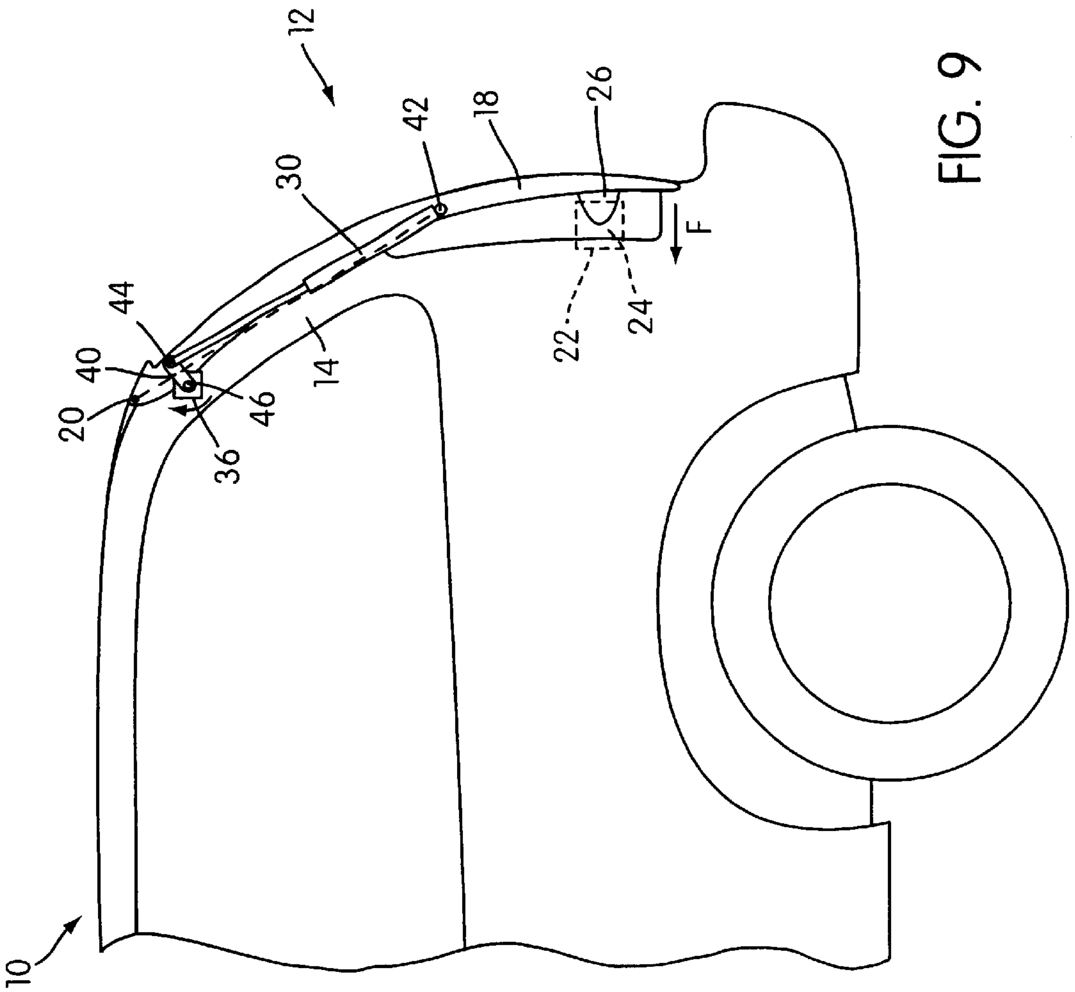
FIG. 9 is a left side elevational view of the automobile of FIG. 1 in schematic form, showing the movement of the strut assembly to interengage a locking mechanism and releasably lock the door in the closed position.

The final steps of the closing sequence, which are illustrated in FIGS. 8 and 9, depend on what type of latch assembly 22 is installed in the rear assembly 12.

If a completely mechanical latch assembly 22 containing no powered actuator is installed, the rotating arm 40 would rotate clockwise as shown in the figures about the arm pivotal axis 46, thus returning to the neutral or original position. The rotation of the rotating arm 40 clockwise (as shown) back to the neutral position, together with the weight of the door, causes an inward force to be applied, forcing the door 18 towards the frame 14 (as indicated by arrow F in FIG. 9). This inward force will be sufficient to cause an unpowered latch 24 and latch striker 26 to engage and releasably lock the door 18 in a closed position. In general, when the strut mounting axis 44 of the strut 30 is positioned outwardly of a line of action between the hinge 20 and pivot point 42 (illustrated as a dotted line in FIG. 9), the line of action of the strut causes a positive, door closing force to be applied to the door 18.

The latch assembly 22 that is installed in the rear assembly 12 may include a powered latch assembly or cinch latch, as discussed above. If such a powered mechanism is installed, it may only be necessary for the clockwise rotation of the rotating arm 40 and weight of the door 18 to move the door 18 close enough to the fully closed position to enable the powered latch 24 to take over the closing action and to cinch the door 18 into sealed, locked relation.

It is anticipated that the geometry of the system, angular positions and the length of the rotating arm 40, will be varied depending on the particular automobile 10 in which the system is installed. The arm length variation may be accomplished by manufacturing rotating arms 40 of different lengths based upon the vehicle, or it may be accomplished by a mechanism to adjust the length of the rotating arm 40 based upon the vehicle. In another contemplated embodiment, the rotating arm 40 may be in the form of a linear actuator, so that the pivot axis 44 is capable not only of rotating about pivot point 42, but can also translate linearly based upon extension or contraction of the linear actuator-forming rotating arm 40. This would provide added flexibility as to the positioning of strut mounting axis 44 during operation. It should be understood that the rotating arm 40 can be any mechanical structure, such as a disk or other geometric shape, that provides a lever or spaced interconnecting structure between the end of the strut 30 and the input rotation provided by the motor.

In the embodiment described above, the mechanical advantage of the strut assembly 28 is adjusted by moving the strut mounting axis 44 along a circular path using the rotating arms 40. However, the motion of the strut axis 44 need not be circular or rotational to achieve the desired change of mechanical advantage of the strut assembly 28. Alternatively, the motion of the first strut axis 44 could be accomplished, for example, with a two degree of freedom (i.e., two-axis) linear actuator or by guiding the pivot axis ends 44 of the struts 30 along a track. If a two-axis linear actuator is used to move the strut assembly 28, the door-raising and door-lowering relations of the assembly 28 could be established, for example, by vertical and horizontal movements of the linear actuator to change the location of pivot axis 44 in a desired fashion. If a track is used, the track need not be linear but can be arcuate, closed loop, or of any desired configuration. The track would guide a motor driven movable mounting structure movable along the track. The mounting structure would carry the pivot axis 44 of the strut 30 to position the pivot axis 44 as desired.

In the door articulation sequence described above, the door 18 falls closed under the influence of gravity, as is illustrated in FIG. 8. As was noted above, if the two struts 30 are not moved coincidentally, the non-coincidental movement of the two struts 30 may be used to provide a more controlled closing sequence for the door 18.

The geometries and strut angular orientations described above may need to be modified according to the ambient temperature in which the automobile 10 is operating. In particular, if the strut 30 is a gas strut, the amount of force output by the gas strut is temperature dependent, as described by Charles's Law, which governs the relationship between the pressure of a compressed gas and the ambient temperature. Modifications to the movements illustrated in FIGS. 2–9 will be described in more detail below.

Control of the Strut Assembly

As was described briefly above, the rear assembly 12 is designed to operate under the control of an electronic control system or controller 41, 141. In general, the electronic control system may have up to four functions: (1) moment-to-moment feedback control over the position of the door, (2) control of the rate of door ascent and descent, (3) obstruction detection, and (4) detection of potentially adverse environmental conditions. The control system 41, 141 may be independent of the power operated system 32 or considered part thereof. The functions of the control system may also include compensation for ambient temperature and other environmental considerations.

In order to develop appropriate control algorithms for the power operated system 32, 152, tests were performed to determine the effects of varying temperatures on the struts 30 in a power liftgate system according to embodiments of the invention. Temperature change testing was performed on mini vans in which a powered liftgate system generally in accordance with the embodiment shown in FIG. 23 was installed. The test system was cycled through movements similar to those illustrated in FIGS. 2–9.

At room temperature, the liftgate 12 opened at an acceptable speed with the motor 40 at full power (i.e., speed) during all movements. To begin the opening sequence, the rotating arms 40 were rotated clockwise approximately 90° relative to the "home" position, after which the latch assembly 22 was released. Immediately after latch release, the rotating arms 40 were rotated back to the "home" position. This test was repeated in high heat conditions, during which the opening sequence logic of the control system remained the same. In high heat, the door 18 opened faster, because the higher temperatures increase the gas pressure of the struts 30, causing them to expand more forcefully against the weight bias of the door 18.

Conversely, a cold environment was found to slow the expansion of the struts 30, because the struts 30 have lower gas pressures in a cold environment. To compensate for the slow expansion rate of the struts 30 in the cold environment, the rotating arms 40 were paused after the initial 90° clockwise rotation and latch release in order to allow the struts 30 to extend. Once the struts were fully extended, the rotating arms 40 were returned to the "home" position. The tests demonstrated that if the system is not paused in cold temperatures so that the struts 30 can extend, the door 18 may re-close from its partially open position.

During the closing segment of the cycle at room temperature, the rotating arms 40 were rotated to clockwise to a position 195° relative to the "home" position. It should be noted that when the system is at rest or in the neutral "home" position at which the pivot axes 42, 44 and 20 are aligned, the arm 40 (or, more precisely, the line extending between points 44 and 46) extends downward and rearward at an angle of about 45° to vertical, in order to establish a positive closing pressure and assist the manual and automatic closing of the door 18. At the 195° position of the rotating arms 40, the speed of the motors 135 is modulated to 55% in order to ensure that the movement of the arm 40 is slightly slower than that of the door 18 as the door 18 reacts to the force of gravity. When the door 18 reaches a "hanging" position, the motor 135 returns to full power as the arm 40 rotates through the most body-out position of its arc, giving enough force to ensure that the latch 24 is pushed onto the latch striker 26. When the latch assembly 22 is engaged, the arm 40 sweeps through its final arc area back to the "home" position with the motor 135 at full power.

For the closing sequence in cold temperatures, the rotating arms 40 were rotated clockwise to a position of approximately 170° from the "home" position, at which point the motor rotation speed was reduced to 55% to slow the rotating arms 40 and follow the door close swing progression. For the closing sequence in hot ambient temperatures (e.g., 65° C.), the rotating arms 40 were rotated clockwise to a position of approximately 220° from the "home" position and the motor rotation speed was not reduced. The higher strut 30 gas pressures caused by the high temperatures created more of a delay in the reaction of the door 18. Therefore, a higher rate of arm speed was needed to keep pace with the door close swing. The remainder of the cycle, the push close and the return to the "home" position at full motor speed remained the same for all temperature conditions. However, in order to speed up the time between cycles, it may be desirable to speed up the motor to over 100% or beyond the "normal" rotation speed in order to shorten the return time to the "home" position.

The control system that is implemented to control and direct the rear assembly 12 may vary from simple to complex, and may draw upon many types of sensing technologies. The actual control system that is implemented would depend upon how many aspects of the system are to be controlled, and upon the desired cost of the system. In the control scenarios given above, the speed of the motor 30 is the primary factor that is controlled to maintain the speed of the door 18 within a desired velocity profile. However, as will become apparent from the following description, there are many other ways in which the struts may be controlled.

Figure 11:
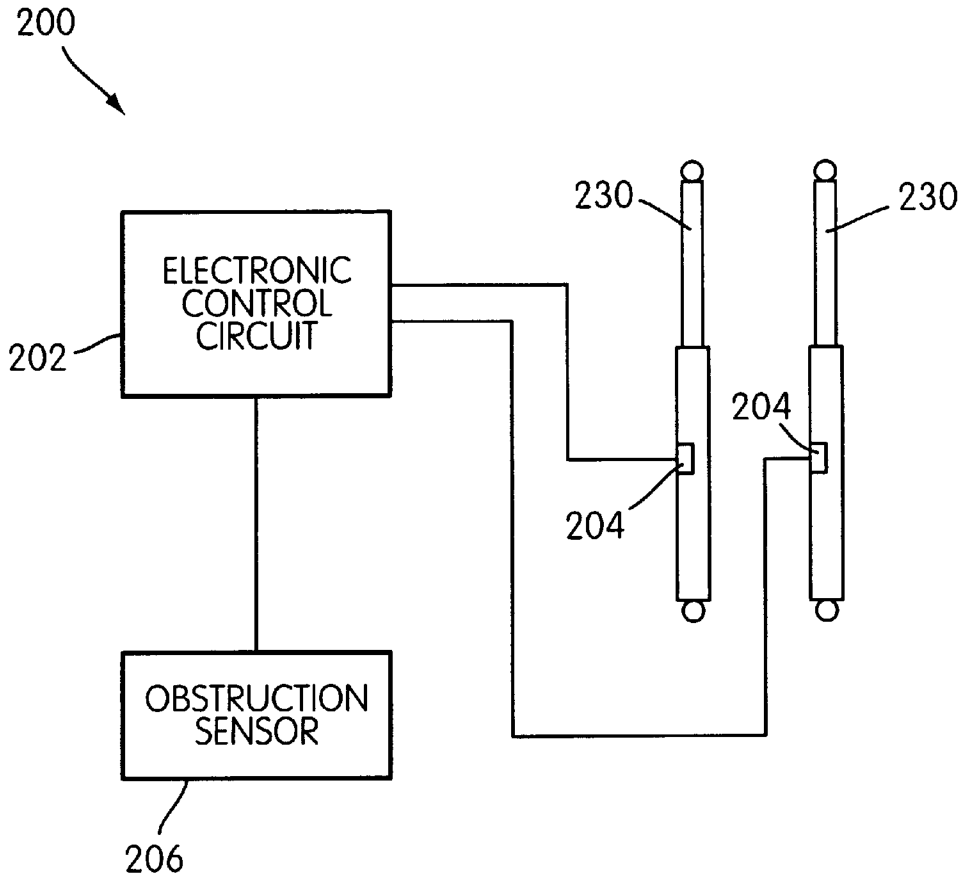
FIG. 11 is a schematic diagram of a control system according to the present invention.

As shown in FIG. 11, the rear assembly 12 may include more sophisticated struts 230 that are electronically controlled locally or internally. The local strut control system 200 is directed by an electronic control system or controller 202. The electronic control circuit 202 may take the form of analog or digital circuitry, a microprocessor and associated components, an ASIC, a general-purpose computer installed in the motor vehicle 10, or any other suitable electronic mechanism. The electronic control circuit 202 may be integrally formed as part of the electronic control system or controller 41. Alternately, the electronic control circuit 202 may be entirely independent of controller 41, in which case it may optionally communicate with controller 41. In this embodiment, struts 30 of the strut assembly 28 are coupled to the electronic control circuit 202, and each strut 230 includes an internal or local rate control structure 204 constructed and arranged to stop the movement of the door 18 upon sensing of a predetermined condition.

Figure 14:
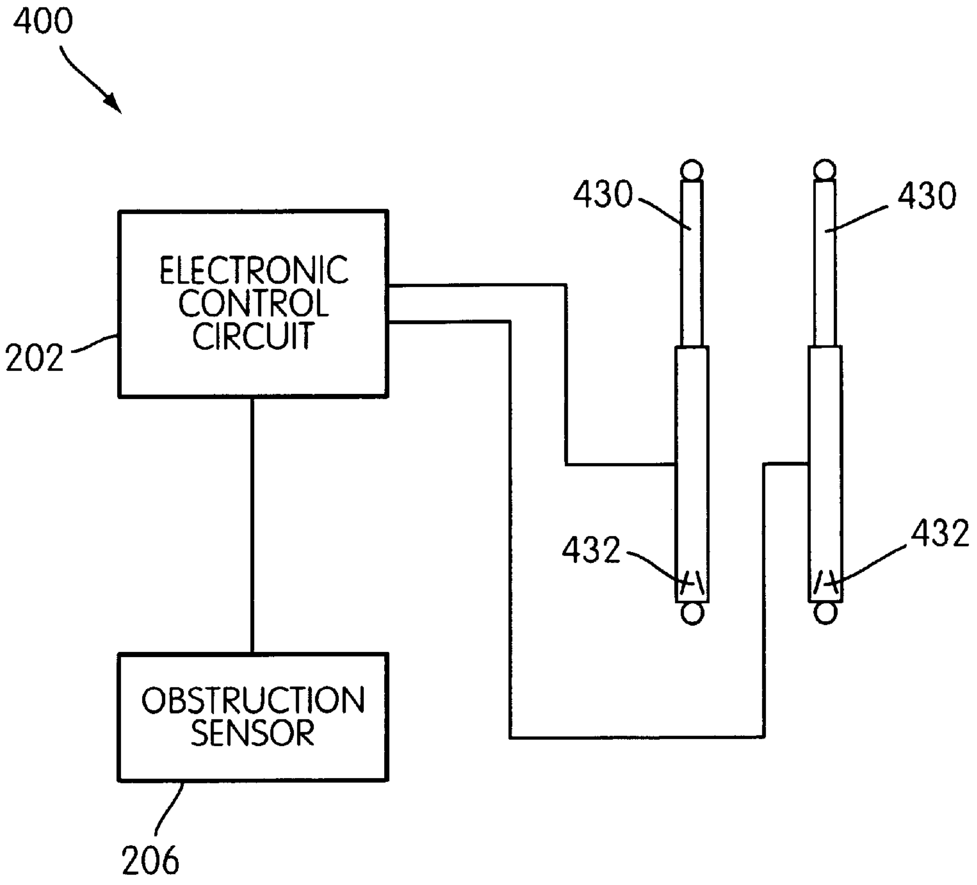
FIG. 14 is a schematic diagram of a third control system according to the present invention.

The rate control structure 204 may be any conventionally known rate control structure compatible with the struts 230. In one embodiment, as shown in FIG. 14, the rate control structure 204 is a restricted orifice assembly that includes a sensor for sensing the speed of the door 18. When the speed is too fast, the internal strut orifice is restricted, thus stopping movement of the door 18. Alternatively, or in combination with this orifice restriction, when the internal strut sensor determines that the door 18 is moving too rapidly, the electronic control circuit 202 can send a signal to the drive motor causing the drive motor 34, 135 to reverse directions, thus causing the door 18 to lift again. Similarly, if it is detected that the door closing operation is stopped or slowed abruptly, the motor 34, 135 will reverse as the controller 202 assumes that an obstruction is present.

In this embodiment, the control system 200 may also include one or more separate obstruction sensors 206 coupled to the electronic control circuit 202. The obstruction sensor 206 provides the electronic control circuit 202 with a simple and direct way to determine whether an obstruction is present in the path of the door 18.

Figure 12:
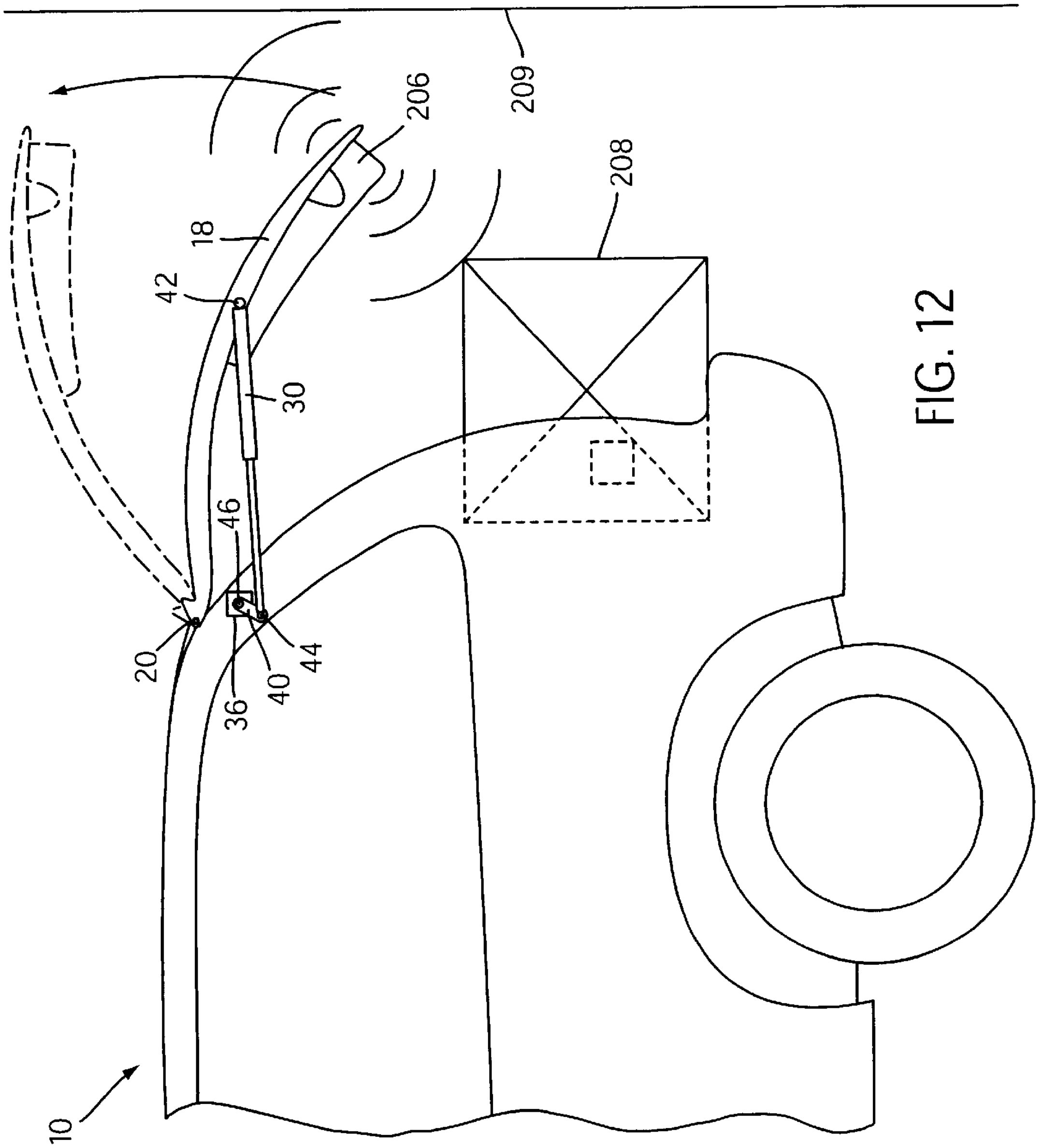
FIG. 12 is a left side elevational view of the rear door of an automobile attempting to close on an obstruction.

The obstruction sensor 206 may be a proximity sensor of an infra-red or ultrasonic type that is positioned as shown in FIG. 12, so that it covers a detection range encompassing the entire range of movement of the door 18. During the opening and closing of the door 18, the control circuit 202 monitors the output of the obstruction sensor 206. If the obstruction sensor 206 detects an obstruction 208, 209 in the path of the door 18, an electrical signal is sent to the electronic control circuit 202. The control circuit 202 then activates the rate control structure 204 of the struts 230 until the obstruction 208 is removed. Additionally or alternatively, a traditional Hall Effect sensor and/or current sensor may be included in the drive motor 34 as known in the art so that the motor 34 can be stopped or reversed if the door 18 impacts an obstruction 208.

The infra-red or ultrasonic "curtain" approach taken in the embodiment of FIG. 12 is particularly useful for detecting and avoiding large objects placed in the path of the door 18. It may also be useful with particularly heavy doors 18, or with strut assemblies 28 that cause the door 18 to move at a high velocity.

In another embodiment, the obstruction sensor 206 is or includes a "pinch bar" of known construction installed along the edge of the frame 14. This conventional pinch bar detects an object being pinched between the vehicle door 18 and body and sends a signal to control circuit 202. The control circuit 202 then sends a signal to motor 34, 135 to reverse the motor and change its direction from the door closing to door opening direction. Alternatively, or in combination with the aforementioned motor reversal, the control system sends a signal to control structure 204 to stop strut extension. This prevents the door 18 from closing on smaller obstructions placed between the frame 14 and the door 18.

The door assembly 12 may not require an ultrasonic or infra-red obstruction sensor, because door assemblies 12 according to the present invention inherently possess some advantageous obstacle avoidance features, such as the lost motion feature discussed previously. In another alternative embodiment, if the door 18 falls shut on an obstacle and the drive motor or motors 34, 135 continue to run, the rotating arms 40 will eventually be rotated back into a position which gives the struts 30 mechanical advantage, causing the door

18 to open again. The motor velocities can be chosen such that if an obstruction is present, the door 18 closes on the obstruction for only a few seconds before automatically opening again. Moreover, because the door 18 falls shut under the influence of gravity (rather than being driven shut by a motor), because the driving force of motor 34, 135 is to some extent decoupled from the door 18 through the lost motion provided by compression or expansion of the strut spring, and because the weight of the door 18 is closely balanced by the bias of the struts 30, the door 18 would not exert great force if it struck an obstruction.

Obstruction detection may be based on the amount of load placed on the door 18, or it may be based on the velocity at which the door is traveling. The particular sensed loads and velocities at which obstruction-avoidance features are triggered may vary with the specifications of the particular sensors that are used and the various jurisdictional safety requirements. However, with load-sensing technology, which is generally relatively insensitive, a detected load of about 225 N would be appropriate to cause the door 18 to reverse direction or otherwise trigger obstruction avoidance. Using door velocity detection, the door 18 may be caused to reverse direction after having a load exerted on it of as little as 15 N. “Pinch bars” of the type described above typically use a force on the order of 45 N as a threshold to cause the door 18 to reverse direction.

Figure 13:
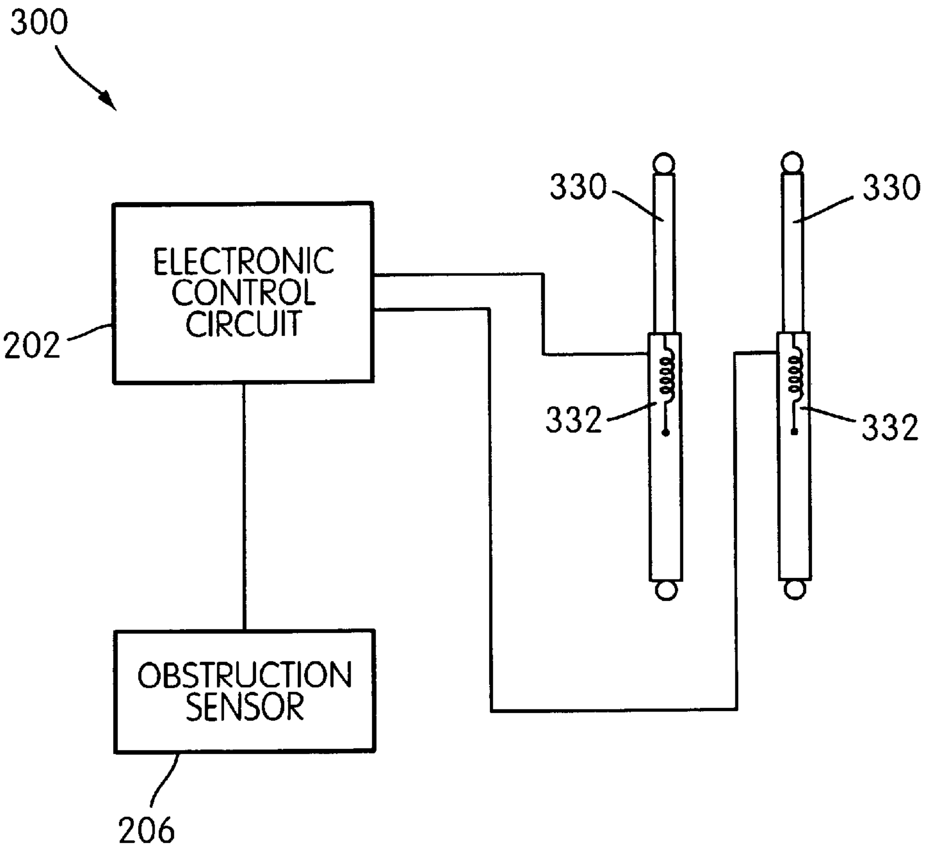
FIG. 13 is a schematic diagram of a second control system according to the present invention.

In another embodiment of a strut control system 300 that is shown schematically in FIG. 13, the struts 330 include strut rate control structure 332 for controlling the rate of movement of the door 18 according to electric signals from the control circuit 202 (and/or 41). In this embodiment, the strut rate control structure 332 includes a Theological fluid disposed within the struts 330 and coupled with an electric or magnetic field generator 334 that is also disposed within the struts 330. If Theological fluid rate control structure 332 is used, the rate of extension or contraction of the strut 330 would change in response to the application of an electric or magnetic field (depending on the particular type of rheological fluid that is employed). Alternately, the rate control structure 332 may include both rheological fluid and a restricted orifice, such that the viscosity of the rheological fluid is changed by application of an electric or magnetic field at the restricted orifice. In either case, the rate control structure 332 allows electronic control of the struts 330, particularly to stop movement of the struts in the event an obstacle is detected or when the speed of the door 18 is determined by the electronic control system to be either faster or slower than a predetermined threshold speed.

In another embodiment of the strut control system 400 that is shown schematically in FIG. 14, the rate control structure 432 of the strut 30 may comprise a restricted orifice structure, in which the rate of extension or contraction of the strut would be determined by the rate at which a fluid disposed within the strut 430 flows through the restricted orifice structure 432.

In either of the previous two embodiments of the present invention, the drive motor 34 may also include a conventional regulator structure to regulate its movement rate, thus changing the rate of movement of the door 18. If the drive motor 34 does include such regulator structure, it could be electrically or mechanically coupled to the control system 41/202.

Figure 15:
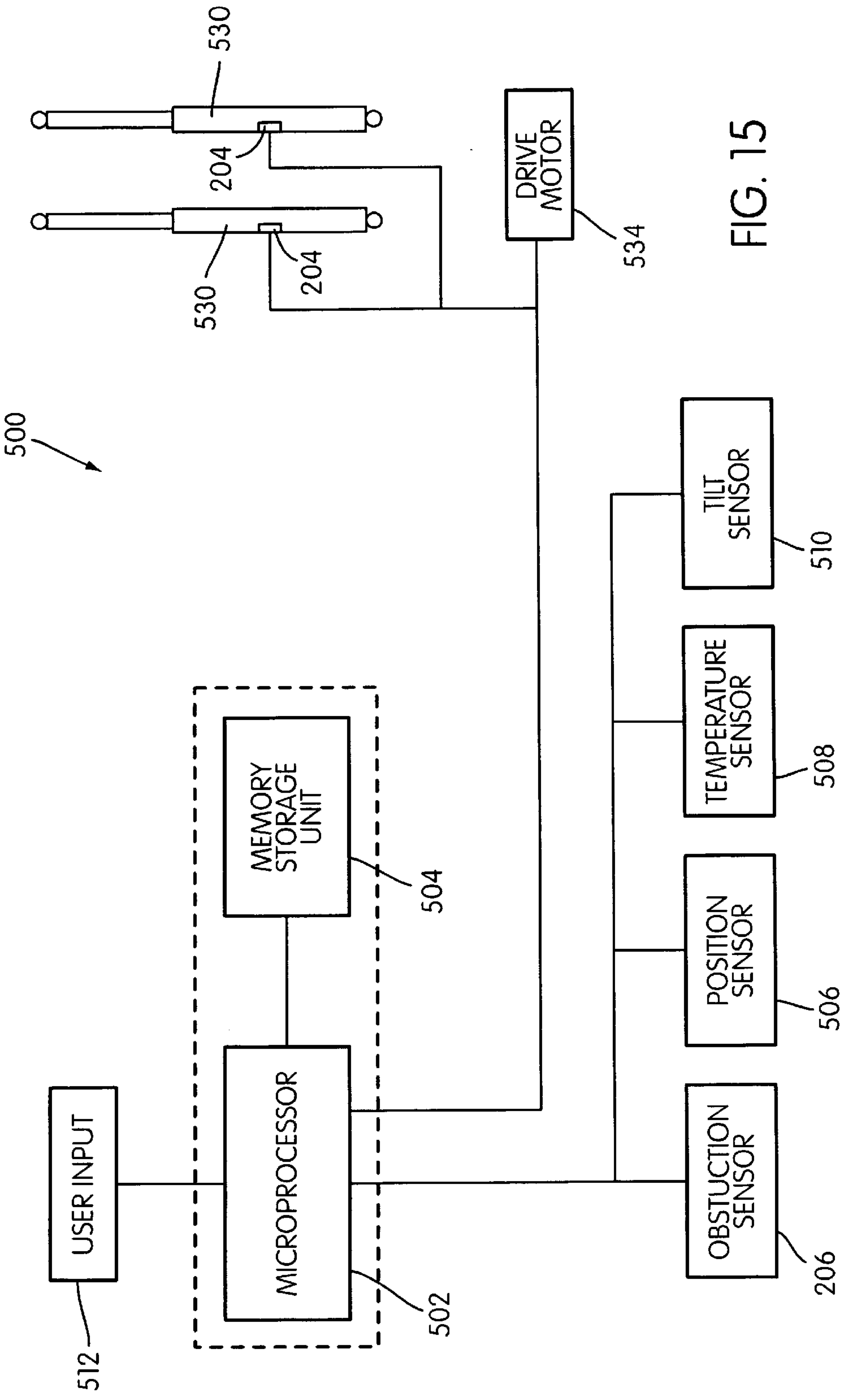
FIG. 15 is a schematic diagram of a fourth control system according to the present invention.

A liftgate control system 500 is shown in FIG. 15. The control system 500 may include a number of features designed to adapt the system for different automobile conditions and different user preferences. As shown in FIG. 15, the control system or controller 502 is a microprocessor or other type of central processing unit and functions as discussed previously with respect to controller 41 and/or 202 in the previous embodiments. The microprocessor 502 may be coupled to a memory storage unit 504, such as an erasable programmable read only memory (EPROM), which contains the instructions necessary for the microprocessor 502 to direct the movement of the door 18.

The embodiment of FIG. 15 includes the features of the previous embodiments. The microprocessor 502 is constructed and adapted to control the speed and direction of the drive motor 534, and may also control strut rate and stop structure 204 if provided as discussed previously. The control system 500 may control the struts 530, to stop the movement of the door 18, to effect a change in the rate of movement of the door 18, or to selectively execute portions of the movement sequence of the struts 530.

Another aspect of the present invention is that the microprocessor 502 is configured to compensate for external or environmental conditions which may effect the performance of the assembly 12. Conditions of interest may include the external temperature and the tilt or relative angle at which the automobile 10 is parked.

As shown in FIG. 15, the microprocessor 502 is preferably coupled to a plurality of sensors including obstruction sensor 206, at least one door position sensor 506, at least one temperature sensor 508, and at least one tilt sensor 510. The microprocessor may receive signals from the obstruction sensor 206, door position sensor 506, temperature sensor 508 and tilt sensor 510. It will be appreciated that any one of these inputs to the microprocessor may be eliminated or modified. Input from the sensors 206, 506, 508, 510 allows the microprocessor 502 to alter the performance of the system 500 in accordance with the conditions to which the automobile 10 is subjected.

The obstruction sensor 206 and obstruction avoidance features of the assembly 12 were discussed in detail above, and this embodiment may include any of the various sensing mechanisms that were discussed. The obstruction sensor 206 of this embodiment includes three obstruction detection mechanisms incorporated into the same vehicle, including (1) a pinch bar, (2) door velocity detection and motor 34 reversal when it is determined that the door 18 is moving too quickly or too slowly, and (3) a current sensor for motor 34, 135 which detects a current spike during the beginning of a closing operation when an obstruction contacts the door and subsequent reversal of motor 34, 135. The current sensing feature indicated above is desirable because when the door 18 is fully opened, the struts 30 are fully extended (i.e., the pistons are fully withdrawn from the cylinders), and thus, an obstruction present at the beginning of a closing operation would not see the benefit of any lost motion or “play” resulting from the resiliency of the gas spring or other spring within the struts.

The door position sensors 506 allow the microprocessor 502 to determine the position of the door 18 during movement, and to compare the position of the door 18 with the information stored in the memory storage unit 504 to determine whether the door 18 is in the proper position at each stage of the movement process. If two drive motors 534 are used in the system, one motor 534 to control each of the two struts 530, then at least one door position sensor 506 would preferably be installed for each motor, so that the motion of the two motors 534 can be coordinated by the microprocessor 502 to achieve the desired movements of the two struts 530.

By comparing the input from the position sensor 506 with the stored instruction set in the memory storage unit 504, the microprocessor 502 can determine the rate at which the door 18 is moving, and can then actuate the drive motor 534 to change the rate of movement of the door 18 as needed. Additionally, it may be advantageous to define different movement rates for the door 18 during different portions of the operational sequence, for example, it may be advantageous to program the microprocessor 502 such that the door 18 opens quickly and closes more slowly. Or, it may be desirable, for example, for the door to close more rapidly during the beginning of the closing cycle and then close more slowly towards the end of the closing cycle. It may also be desirable for the door to open slowly, then speed up for an interval, and then slow again towards the final opening stages.

The door position sensor 506 can be an angle encoder associated with the hinge assembly 20 or inclinometer mounted on the door 18 as will be discussed later.

It is contemplated that the position sensing function could alternately be performed by determining the amount of load on the struts 530 during a portion of the operational sequence of the assembly 12 and comparing the measured loads to information stored by the microprocessor 502. The load on each of the struts may be measured in several ways, including measuring the gas pressure inside a gas strut (with a strain gauge or piezoelectric sensor) or directly measuring the load using a load cell or other load transducer. The position sensor 506 may be any sensor that either directly or indirectly provides the microprocessor 502 with data on the position of one or both of the struts or the door 18 itself.

The microprocessor 502 is preferably also coupled to a temperature sensor 508 and at least one tilt sensor 510. Some vehicles are already provided with a tilt sensor, used for various vehicle functions. The input from the temperature sensor 508 allows the microprocessor 502 to determine whether the movement sequence of the struts 530 and the door 18 need to be adapted, for example, to compensate for the performance change of a strut 530 on a particularly hot or cold day, causing resultant expansion or contraction of the gas within the struts 530. For example, on a particularly cold day the gas within struts 530 will not exert as much opening spring force as on a hot day. Thus, the temperature sensor will send an appropriate signal to the microprocessor to alter the standard motor 534 action to accommodate the change in temperature.

The input from the tilt sensor 510 allows the microprocessor 502 to determine whether the automobile 10 is sitting on an inclined surface. Because the movement of the door 18 is weight-biased, the angle at which the automobile 10 is tilted or inclined can have an effect on the performance of the system. The instructions stored in memory storage unit 504 include instructions for altering the movement rate or angular orientation of the struts 530 in order to compensate for the tilt that is reported by tilt sensor 510.

It is also contemplated that a plurality of tilt sensors 510 could be installed at various points in the automobile 10 to monitor the tilt of the automobile 10 along a plurality of axes. If the microprocessor 502 is modified to accept tilt input from a plurality of tilt sensors 510, then the microprocessor may also be adapted to alter the performance of each individual strut 530 (e.g., increase the input power or rate of movement of only one strut 530 to compensate for tilt).

In one embodiment of the invention, a single tilt sensor 510 is employed in the liftgate control system 500. This tilt sensor is a micro-electromechanical (MEMS) inclination sensor, formed on a single integrated circuit (IC) chip. One example of a commercial sensor of this type is a MEMSIC MX1010xx acceleration measurement system (MEMSIC, Inc.). In this sensor, a centrally located heater resistor is placed between two tiny thermocouples. A small gas bubble is entrained between the thermocouples. As the sensor tilts, the gas bubble changes position, and one of the thermocouples senses a change in the temperature profile.

The inputs provided by the sensors in this embodiment also allow the microprocessor 502 to determine whether the liftgate control system 500 and strut assembly 28 are performing optimally, and to compensate for changes in performance. If, for example, the microprocessor 502 determines that the rate of movement of both struts 530 is below a desired rate, the speed of motor 534 could be increased to compensate for this performance change.

The control system 500 may also be equipped with an additional feature to disable the struts 530 and prevent movement of the door 18 if an extreme deterioration in system performance is encountered. For example, if the microprocessor implements several compensations (e.g. rate of movement increases) to compensate for poor performance and the performance does not reach the desired level, the microprocessor 502 could disable the system 500 and refuse additional commands to move the door 18 until maintenance is performed. The door 18 will then operate in a manual mode as discussed previously.

Figure 16:
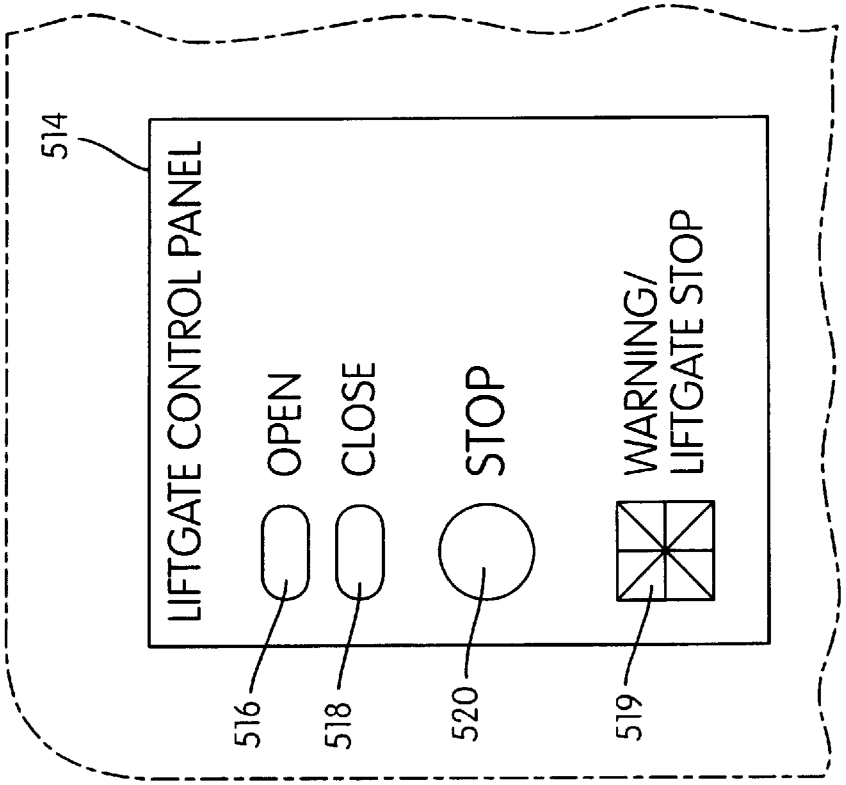
FIG. 16 is a perspective view of a vehicle-mounted control panel according to the present invention.

In FIG. 15, the microprocessor 502 is coupled to a user input system 512. The user input system 512 accepts commands from the user and conveys those commands to the microprocessor 502. The user input system 512 itself has two main components in this exemplary embodiment, a vehicle-mounted control panel 514 and a remote device 522. The vehicle-mounted control panel 514 is shown in FIG. 16. As shown, the control panel 514 includes three buttons, an open button 516 to open the door 18, a close button 518 to close the door structure, and a stop button 520 to halt the movement of the door 18 if necessary. The control panel 514 may also include a warning light 519 to indicate an obstruction or other disabling problem with the system. This vehicle control panel 514 may be mounted anywhere within the automobile. In addition, it is anticipated that multiple vehicle control panels 514 may be installed within the automobile 10 for user convenience. If multiple control panels 514 are installed in the automobile 10, the microprocessor 502 may be programmed to accept input from one control panel 514 preferentially, or it may accept input from all of the control panels 514.

Figure 17:
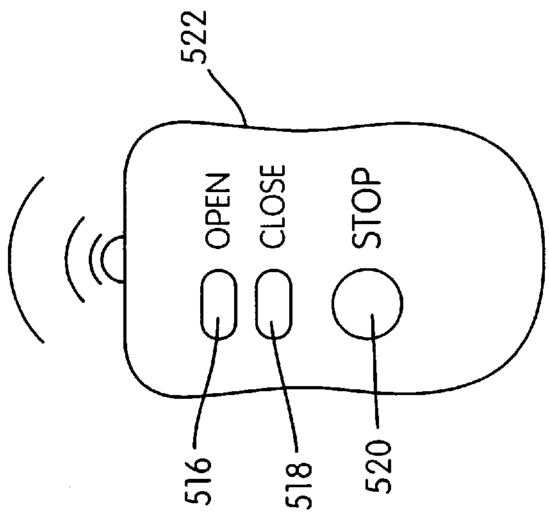
FIG. 17 is a perspective view of a remote-control device according to the present invention.

The remote device 522, as illustrated in FIG. 17, is an infra-red or radio frequency transmitter of a type commonly known in the art. This remote device 522 may be a key fob, or a larger hand-held type of transmitter. The remote device 522 has the same three buttons 516, 518, 520 as the vehicle mounted control panel 514 and would be used to open the door 18 from a location outside of the automobile 10. The remote device 522 may include a warning light, depending upon the space available on the device 522.

In any of the embodiments described above, either the user input system 512 or microprocessor 502 may be coupled to other sensors within the automobile 10. If either system 502 or 512 is coupled to other sensors within the automobile 10, either system may be configured to prevent movement of the door 10 unless the automobile is in a stopped or a parked condition. This would prevent opening of the door 18 while the vehicle is in motion.

Additional Sensing and Monitoring Technologies for Liftgate Control

There are several door position sensing technologies that may be used to determine the position of the door 18 in rear assemblies 12, 152 according to the present invention. Generally, the objective of the door position sensor (or sensors) is to measure the angular position of the door 18 relative to the door frame 14. The precise type of sensor that is employed may depend on whether or not the hinge assembly 20 of the door 18 is accessible and can be configured to interface with a rotary angular position encoder. The type of sensor that is employed may also depend on cost considerations, as positional encoders are generally expensive.

If a rotary angular position encoder is to be used and the hinge assembly 20 is accessible, the shaft of the sensor or rotary encoder can be attached directly to the hinge to measure the rotation of the hinge or hinge shaft as a function of time. Alternatively, the rotary sensor could be assembled into a "pincher," "clothespin," or "scissor"-type sub-assembly. In this type of assembly, two "legs" are provided. One of the legs of the sub-assembly is in contact with the moving door, while the other leg of the sub-assembly is held stationary against the chassis or door sill. As the door 18 moves, the rotary sensor, located between the two legs, rotates to determine relative angular movement between the legs as the legs are "pinched" shut, generating an output signal as a function of the angular movement. The output signal is received by a control unit to control the movement of door 18.

A linear-type position sensor may alternatively be used. Suitable sensors include linear sensors, linear variable differential transducers (LVDTs), string potentiometers, and cable devices. To use a linear-type position sensor, the angular motion of the door 18 about the hinge assembly 20 could be mechanically converted into a linear motion detectable by the linear-type position sensor. The conversion of rotational into linear motion could be accomplished by an arrangement of cam lobes, cables, pulleys, or mechanical linkages of varying complexity. For example, a cable may be connected to the door 18 and trained about one or more pulleys mounted to the vehicle body. A linear sensor would measure the linear travel of the cable during opening and closing of the door and send a signal to a control system to determine the door position. The exact arrangement of the mechanical components would depend upon the requirements of the linear-type sensor, the amount of available space, and other factors.

A linear-type position sensor is particularly useful in cases where the hinge assembly 20 of the assembly 12, or other another rotating part, is not directly accessible to or easily interfaced with a rotary encoder. Once an output signal is generated by the linear-type sensor, it may be recalibrated and linearized by a control system, using either a hardware-based or software-based mathematical algorithm. Because of the additional processing power required for this type of mathematical calculation, as well as the mechanical complexity of the translation system, a rotary-type sensor may be more easily implemented than a comparable linear-type sensor. In either case, the resulting output would preferably be descriptive of the angular position of the door as a function of time.

The output signal may be either analog or digital, as may the output signals from the other components discussed above, depending on the nature of the microprocessor or electronic control system that is employed, and the amount of electrical noise in the system. Conversion between analog and digital signals, or vice-versa, may be accomplished by any number of known hardware technologies. Alternatively, in the case of a real-time or post-processing type of calculation, any number of known software techniques may be used as well. The conversion may be performed by an electronic control system, or by circuits or software inside the sensor itself.

If the electronic control system requires, or if it is desired, the output signal of door position versus time may be differentiated into a velocity, acceleration, or jerk signal. For example, a control unit may control the door 18 based on a velocity signal, if the velocity of the door 18 is more easily determined. Alternatively, the position and time values could be used directly to determine velocity, without a mathematical differentiation process.

Several additional types of technologies may be used for the door position sensor 506 to measure the position of the door 18. These sensor technologies include noncontact Hall Effect technology, noncontact compacitative technology, noncontact inductive technology, noncontact absolute optical encoder technology, noncontact incremental optical encoder technology, contacting linear variable differential transformer (LVDT) technology, contacting rotary variable differential transformer (RVDT) technology, contacting potentiometer or voltage divider technology (including resistive tape, foil, ink, and resistor-based technologies), and various combinations of the technologies above.

Typically, the overall linear accuracy of a rotary sensor varies within the range of ±3% for a lower-quality, potentiometer-based technology, such as a throttle position sensor (TPS). Mid-level potentiometer-based sensors have accuracies of about ±1%, while more expensive sensors may have accuracies in the range of ±0.5%. One particularly suitable rotary position sensor for use in the present invention is a CTS® Single Ear Position Sensor (Small Engine Series) sold by CTS Automotive Products of Elkhart, Ind.

One difficulty with a rotary or linear sensor is that the sensor may detect minor deflections within the rear assembly 12 caused by component-to-component clearances, bending stresses, asymmetrical door loading, sudden wind loads, long term component wear, component aging, or improper tolerances during the initial assembly process. These may occur in either the door 18, or mating components of the vehicle 10. From the perspective of the hinge assembly 20, the minor deflections may be perceived to be actual door motion, leading to sensor inaccuracy. In addition, as the vehicle 10 ages, component wear increases and structural changes of the door or vehicle body become more likely, and therefore the door positional sensor may become more inaccurate.

Another disadvantage of positional encoders is that they are relatively expensive and provide a level of precision that may not be necessary in a typical powered system 32, 152. Rather than using a positional encoder of the types described above, the position of the door 18 could be determined by using a combination of simpler, less expensive sensors. For example, the position of the door 18 could be determined by a Hall Effect sensor coupled to the motors and a "home" position sensor (e.g., a simple switch) to indicate when the rotating arms 40 had reached the "home" or neutral position.

Yet another alternative type of door position sensor that is particularly suitable for the rear assemblies 12, 152 according to the present invention is an inclinometer directly installed on or within the door 18 to measure its absolute inclination relative to gravitational forces of the earth. Inclinometers can measure the inclination of the door 18 regardless of the position or condition of the frame 14, and thus, will not be influenced any minor deflections or structural variations in the positioning of the door 18 relative to the frame 14 as the vehicle 10 ages. Inclinometers also do not require installation on the hinge assembly 20.

In general, inclinometers are less complicated than the rotary or linear sensor, and are easier to install and maintain. Additionally, an inclinometer installed in the door 18 may replace a vehicle tilt sensor installed within an electronic control unit 500. Thus, in addition to door position, the inclinometer may be used to simultaneously detect vehicle tilt, leveling variances within the vehicle, or problems with the vehicle suspension. An inclinometer may be used to provide such vehicle tilt information when the door 18 is either in the closed position or the fully open position. Alternatively, an inclinometer installed in the door 18 can be used in conjunction with a separate tilt sensor installed in the vehicle body, thus providing a control unit with inclination information for both the vehicle 10 and the door 18, which can then be used to determine the position of the door 18 with respect to gravitational forces and the vehicle body. An advantage of employing an inclinometer mounted on the door 18 as position sensor is that its sensing of absolute door inclination with respect to gravitational forces provides information that enables a control unit to determine the force acting on the struts 30, since that force is a function of the angular position of the door 18 with respect to gravity.

An inclinometer may also be used as a position sensor if the electronic control unit reads the rate of change of inclination with respect to time, for example, by comparing the inclination readings with an internal timer. The speed of the motor may then be adjusted in accordance with the output of the inclinometer in a continuous feedback control scheme.

Several types of inclinometers are compatible with the rear assembly 12 according to the present invention. These include liquid level devices (e.g., simple mercury switches with contacts at each end), rolling ball-based sensors (e.g., gas bag sensors), liquid level/detector chamber devices, gaseous bubble detector devices (e.g., the MEMSIC device described above), and gravity-based pendulum devices. The pendulum-based device is one of the more suitable designs for this application, as it is relatively insensitive to temperature changes (whereas liquid-containing inclinometers tend to freeze), and may be more stable than the other types of inclinometers.

In its simplest form, a pendulum-based (offset weight) inclinometer sensor is constructed of an offset weight, or pendulum, affixed to a precision rotating shaft. The shaft is supported on each side by high-precision, low-friction ball bearings, which are fixed to the static outer casing of the sensor. The case is attached to the door 18 by means of screw holes molded into the inclinometer casing. As the door 18 is rotated, the pendulum continues to point in the direction of gravity while the case of the sensor rotates with the door 18. Thus, the pendulum rotates relative to the casing of the inclinometer sensor as the door 18 moves. A small rotary encoder installed within the sensor records the movement of the pendulum relative to the casing. The rotary sensor may be one of any of the types of rotary sensors discussed above. The accuracy of the rotary encoder may be selected to determine the overall accuracy of the inclinometer. As with the other components of the system, the inclinometer output signal may be of any compatible or desired type, including analog, digital, TTL, and quadrature signals.

Inclinometers are generally designed to follow relatively slow changes in angular position. By design, the inclinometers tend to overshoot the actual value of angular position when the object being measured is accelerated or decelerated rapidly, or when the frequency of oscillation becomes greater than a certain value.

An inclinometer installed in the door 18 is preferably damped such that it does not respond to minor oscillations or high-frequency vibrations.

Several methods are available for damping the inclinometer as contemplated by the present invention. These methods include fluidic damping, frictional damping, and magnetic damping, and are described here in terms of a pendulum-type inclinometer. In fluidic damping, the pendulum is submerged in a heavy oil or alcohol, which acts to resist small pendulum deflections. In frictional damping, the pendulum is forced to rub against a frictional material as it moves, causing resistance to the pendulum's movement. In magnetic damping, magnets surround a ferromagnetic pendulum, and the magnetic forces act to resist small oscillatory movements of the pendulum.

Magnetic damping may be the most convenient form of damping for a pendulum inclinometer to be used in the rear assembly 12, because there is less component wear, and no chance of a liquid medium freezing. One commercial inclinometer of this type that is particularly suitable for use in the present invention is the A2I 360° Absolute Inclinometer, sold by U.S. Digital Corporation of Vancouver, Wash.

All of the sensors and encoders described above may be generally described as "dynamic property detectors" in that they each detect a dynamic property (e.g., position, velocity, acceleration, inclination) of the moving liftgate door 18.

Control System Logic for Liftgate Control

Control logic algorithms appropriate for an automated pivoted closure according to embodiments of the invention will be described with respect to a simplified control system 600 similar to control system 500 of FIG. 15. However, the logic and principles described with respect to control system 600 may be applied to any of the other control systems described herein. Additionally, the features of the other control system embodiments may be used in various combinations with control logic algorithms similar to those described here.

Figure 18:
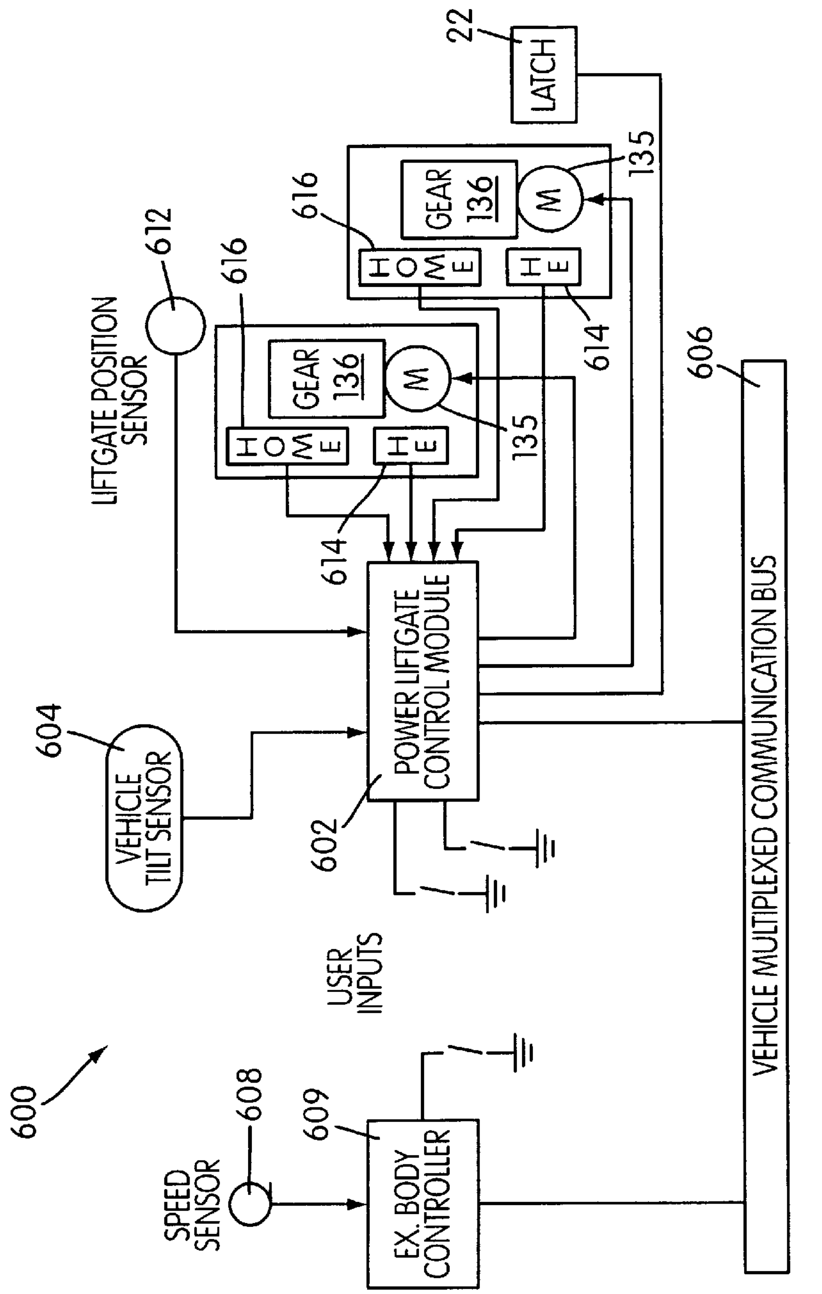
FIG. 18 is a schematic diagram of another liftgate control system according to the present invention.

FIG. 18 schematically illustrates the components of control system 600, which is suitable for use with the two-motor powered system 152 illustrated in FIG. 23. As shown, the control system 600 includes a control module 602, which includes a microprocessor and other appropriate computing devices as described above. The control system 600 also includes a vehicle tilt sensor 604 and powered latch assembly 22 in communication with the control module 602. The control module 602 is connected to the main multiplexed communication bus 606 of the automobile 10. As shown, the vehicle speed sensor 608 (which connects to the external body controller 609) is also in communication with the control module 602 through the, multiplexed communication bus 606.

The control system 600 also includes a liftgate position sensor 612 which monitors the position of the liftgate door 18 as it moves. The liftgate position sensor 612 may be any one of the types of sensors described above. Depending on the design of the rear assembly 12 of the automobile 10, the liftgate position sensor 612 may or may not be directly coupled to the liftgate hinge 20, and may be an absolute or a relative position sensor. If a gravity-based inclinometer is used as the liftgate position sensor 612, vehicle tilt information can be obtained by reading the value of the liftgate position sensor 612 prior to actuation of the liftgate door 18, which may make the vehicle tilt sensor 604 unnecessary. Also, a gravity-based inclinometer may be used as a position sensor, as described above.

The two gearboxes 136 of the powered system 152 (one for the left-side strut and one for the fight-side strut as shown in FIG. 23) are schematically illustrated in FIG. 18. The motor 135 and gearbox 136 are shown schematically. As shown, each of the gearboxes 136 includes a motor speed sensor 614 and a "home" position sensor 616. The motor speed sensor 614 of this embodiment is a Hall Effect sensor or another similar type of sensor. The "home" position sensor 616 of this embodiment a simple switch that activates when the rotating arm 40 returns to the "home" position, although the "home" position sensor 616 may be implemented as a Hall Effect or similar sensor in other embodiments. In general, the Hall Effect motor speed sensor 614 functions by counting pulses relative to the position of the rotating arm 40 in the "home" position. (The rotating arm 40 would be in the "home" position when the door 18 is either fully opened or fully closed.)

The user inputs to control system 600 are not shown in FIG. 18. The control system 600 may take user input from the control panel 514 and remote device 522 shown in FIGS. 16 and 17, respectively, which would be in communication with the control module 602 through the communication bus 606.

Figure 19:
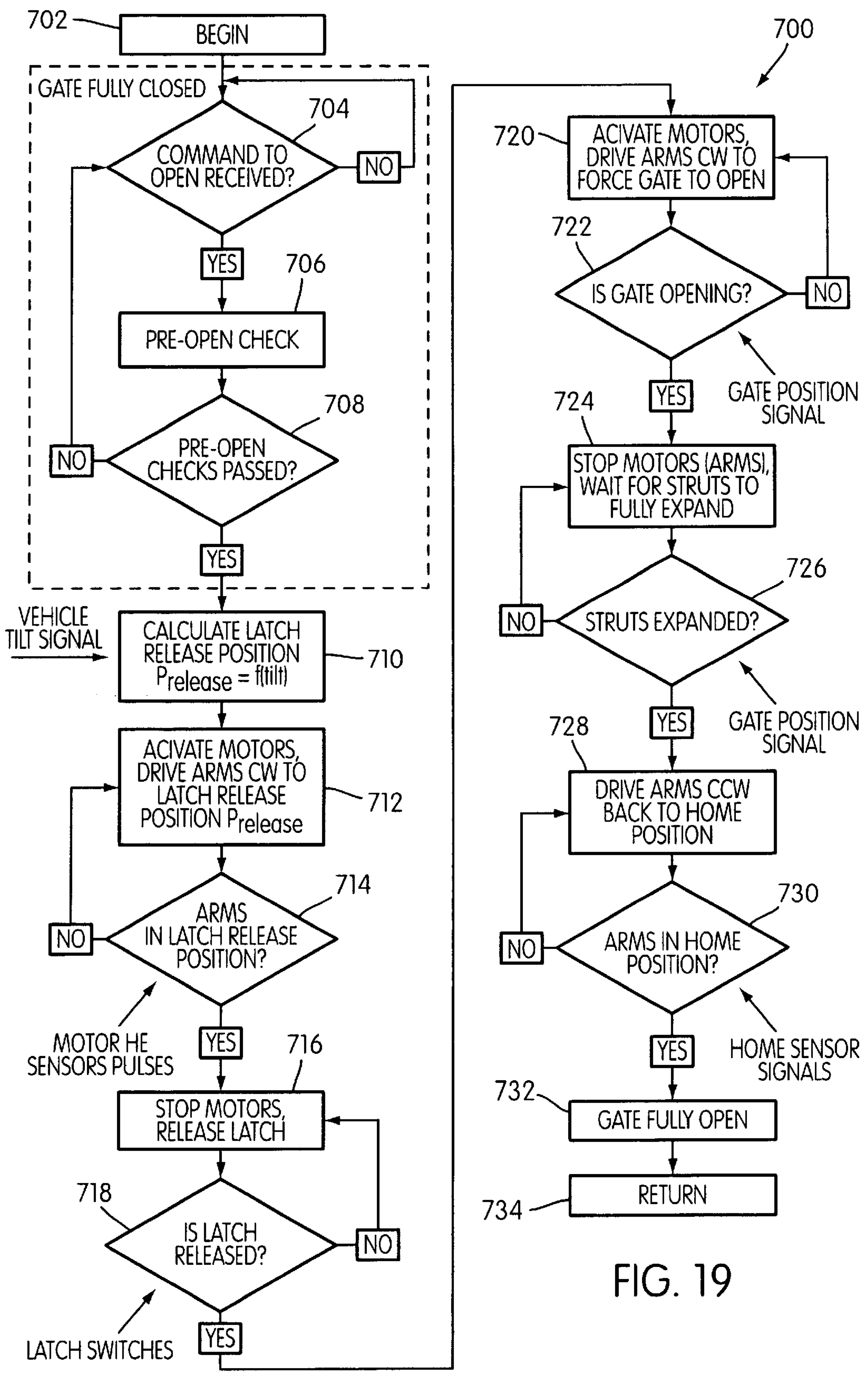
FIG. 19 is a high-level flow diagram of a control algorithm for opening a liftgate using the control system of FIG. 18.

A control algorithm 700 for a door-opening sequence using control system 600 is shown in the block diagram of FIG. 19. In FIG. 19, the algorithm 700 begins at block 702 with the liftgate door 18 in the closed position. The algorithm proceeds to block 704. At block 704, the control system 600 determines whether the command to open the door 18 has been issued. If the command to open the door 18 has been issued (block 704: YES), control passes to block 706. If the command to open the door 18 has not been issued (block 704: NO), control returns to block 704.

In block 706, pre-opening system checks are performed. These pre-opening system checks include checking whether the battery voltage is within a programmed range (e.g., 9–16 VDC), checking whether the vehicle tilt exceeds the design limitations, checking whether the vehicle transmission is set to "park," checking whether the vehicle is moving, and checking for any other vehicle-specific safety hazards. Additionally, if the rotating arms 40 are not in the "home" position, as indicated by "home" position sensor 616), the control module 602 may direct the motors 135 to move the rotating arms 40 into the "home" position so as to ensure a consistent starting position. Each of these pre-opening system checks may involve multiple measurements and decision blocks, although for simplicity, these additional measurement and decision blocks are not shown in FIG. 19. Once block 706 is complete, control passes to block 708, a decision block. In block 708, if any of the pre-start checks have failed (block 706: NO), control returns to block 704 and the liftgate door 18 remains closed. Otherwise (block 708: YES), control passes to block 710.

In block 710, the control module 602 calculates the position of the rotating arms 40 at which the latch assembly 22 will be released. This release position is a function of the vehicle tilt, and so input is taken from vehicle tilt sensor 604, or alternatively, if the door 18 is equipped with an inclinometer liftgate position sensor 612, input may be taken from the liftgate position sensor 612 to determine the vehicle tilt. Once the latch release position has been calculated, control passes to block 712.

In block 712 the motors 134 are activated to move the rotating arms 40 to a position at which the struts 30 begin to exert outward and upward force on the liftgate door 18. In this embodiment, the rotating arms are driven clockwise during this task. As the rotating arms 40 reach the latch release position, control passes to block 714. At block 714, the control module tests whether the rotating arms 40 have reached the latch release position. If the rotating arms 40 have reached the latch release position calculated in block 710 (block 714: YES), control passes to block 716. Otherwise (block 714: NO), control returns to block 712 and the rotating arms 40 continue to move towards the latch release position.

In block 716, the latch 24 is released by a command from the control module 602 and the liftgate door 18 begins to open. Control passes to block 718, in which the control module 602 tests whether the latch 24 has been released. If the latch has been released (block 718: YES), control passes to block 720. Otherwise (block 718: NO), control returns to block 716 and the control module 602 once again attempts to release the latch 24.

In block 720, the liftgate door 18 opens as the motors 134 are activated to drive the rotating arms 40 as illustrated in FIG. 4, i.e., in a clockwise direction. Control passes to block 722. In block 722, the control module 602 confirms that the door 18 is opening, and if so (block 722: YES), control passes to block 724. Otherwise (block 722: NO), control returns to block 720 and the rotating arms 40 continue to move.

At block 724, the rotating arms 40 have reached a designated position. The motors 134 are stopped to allow the struts 30 time to expand against the weight bias of the door 18 to push the door 18 toward the open position. Control passes to block 726. In block 726, the control module 602 checks whether the struts 30 have fully extended. If the struts 30 are fully extended (block 726: YES), control passes to block 728. Otherwise (block 726: NO) control returns to block 724.

In block 728, the control module 602 activates the motors 135 to drive the rotating arms 40 counter-clockwise, back to the "home" position. Once the rotating arms 40 are in the "home" position, the door 18 can remain open under the bias provided by the struts 30 for an indefinite period of time. Control passes to block 730. In block 730, the control module 602 determines whether the rotating arms 40 have reached the "home" position. If the rotating arms 40 have reached the "home" position (block 730: YES), then the door 18 is fully open, as indicated at block 732, and control passes to block 734, in which the algorithm terminates and returns. Otherwise (block 730: NO), control returns to block 728.

Figure 20:
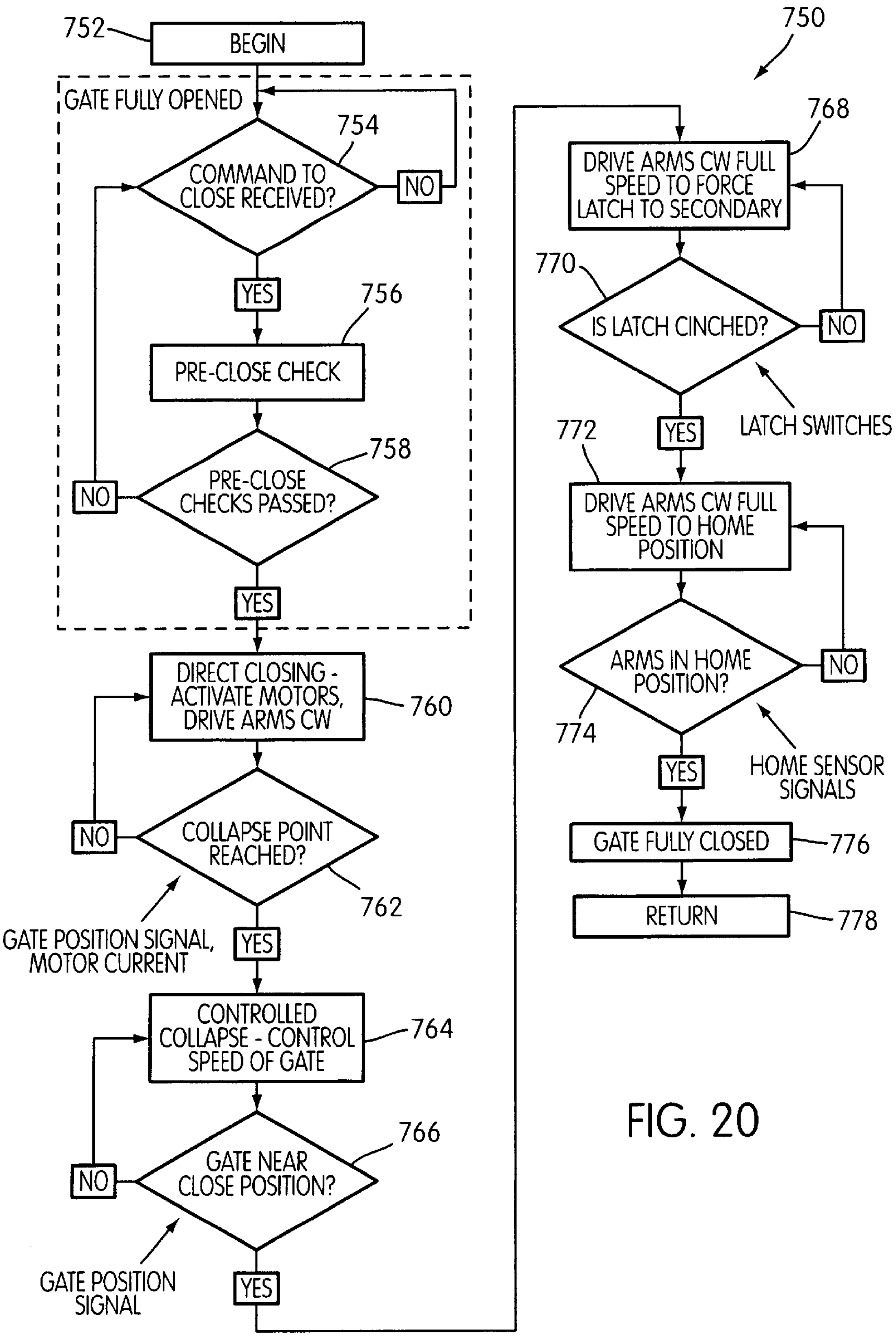
FIG. 20 is a high-level flow diagram of a control algorithm for closing a liftgate using the control system of FIG. 18.

A control algorithm 750 for a door-closing sequence using control system 600 is shown in the block diagram of FIG. 20. The algorithm 750 begins at block 752 with the liftgate door 18 open and control passes to block 754. In block 754, the control module 602 determines whether the command to open the door 18 has been issued. If the command to open the door 18 has been issued (block 754: YES), control passes to block 756. If the command to open the door 18 has been issued (block 754: YES), control passes to block 756. Otherwise (block 754: NO), control returns to block 754.

In block 756, pre-opening system checks are performed. These pre-opening system checks may be the same as those in block 706 of FIG. 19 and include checking whether the battery voltage is within a programmed range (e.g., 9–16 VDC), checking whether the vehicle tilt exceeds the design limitations, checking whether the vehicle transmission is set to "park," checking whether the vehicle is moving, and checking for any other vehicle-specific safety hazards. Each of these pre-opening system checks may involve multiple measurements and decision blocks, although for simplicity, these additional measurement and decision blocks are not shown in FIG. 20. Once block 756 is complete, control passes to block 758, a decision block. In block 758, if any of the pre-start checks have failed (block 706: NO), control returns to block 754 and the liftgate door 18 remains open. Otherwise (block 708: YES), control passes to block 760.

In block 760, the control module 602 activates the motors 135, causing the rotating arms 40 to move clockwise. Once the rotating arms 40 are moving, control passes to block 762. In block 762, the control module 602 determines whether the "collapse point" has been reached, i.e., whether or not the struts 30 have begun to collapse under the weight bias of the door 18. If the "collapse point" has been reached (block 762: YES), control passes to block 764. Otherwise (block 762: NO), control returns to block 760 and the rotating arms 40 continue to move.

Figure 22:
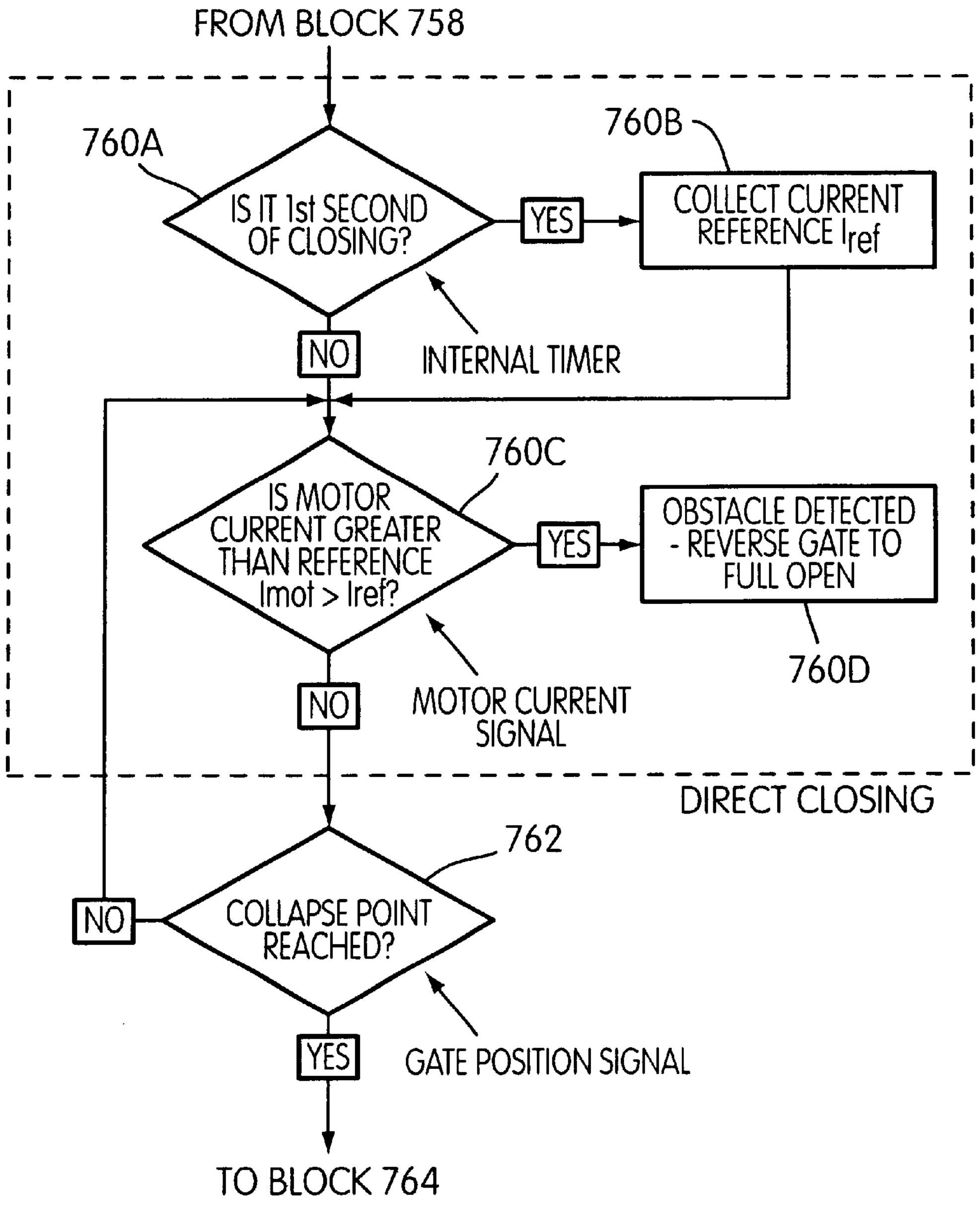
FIG. 22 is another flow diagram illustrating portions of the diagram of FIG. 20 in more detail.

Blocks 760, 762 and 764 include several features that are not shown in FIG. 20, including obstacle detection. Block 760 is shown in more detail in FIG. 22, a detailed schematic diagram. As shown, block 760 begins with decision task 760A, in which the control module 602 determines whether it is the first second (or, more generally, the first instant) of door closing. If the present instant is within the first second of closing (task 760A: YES), control passes to task 760B, where the control module 602 measures and stores in memory the current that the motor 135 is drawing. Control then passes from task 760B to task 760C. Otherwise (task 760A: NO), control passes directly to task 760C.

In task 760C of block 760, the control module 602 determines whether the present current that the motor 135 is drawing ($I_{mot}$ in FIG. 22) is greater than the reference current ($I_{ref}$ in FIG. 22) that was measured and stored in task 760B. If the motor current is greater than the reference current (task 760C: YES), control passes to task 760D, at which point an obstruction to door movement is assumed to exist and the direction of movement of the door 18 is reversed. Otherwise (task 760C: NO), control passes to block 762 while the rotating arms 40 continue to move.

Block 760 provides a motor-based type of obstacle detection that is implemented as the motor begins to activate. The obstruction detection of block 760 may also be performed continuously or at designated points throughout algorithms 700 and 750. Additionally, the control module 602 may poll (i.e., interrogate) any pinch bars or other obstruction detection systems that are installed to determine whether an obstruction exists at any point in algorithms 700 and 750.

After the "collapse point" detected in block 762, the control system 600 controls the movement of the door 18 somewhat differently. Prior to the "collapse point," the struts 30 act as rigid, incompressible members, and movement in the system is confined to the rotating arms 40. Once the "collapse point" has been reached, the struts 30 act as compressible members and collapse while the rotating arms 40 are moving. As another feature, the control module 602 may be programmed to know or anticipate when the "collapse point" will occur. This type of anticipation would be advantageous because the control module 602 would then be able to accommodate the change and keep the door 18 from moving too quickly. There are three ways in which the control module 602 might anticipate the "collapse point." First, the current drawn by the motor 135 will spike when gravity begins to effect the struts 30, and the control module 602 may be programmed to recognize this current spike. Second, the control module 602 may be programmed to detect a sudden increase in liftgate door velocity from the liftgate position sensor 612 and to recognize this event as the "collapse point." Third, the control module 602 may be programmed to conclude, based on the position of the rotating arms 40, that the "collapse point" must have been reached for any reasonable inclination of the vehicle 10.

The "controlled collapse" of block 764 is a segment of the closing sequence of the door during which the movement rate of the door 18 is maintained within a desired velocity profile. The "desired velocity profile" is, in one embodiment, a substantially constant speed, and the movement velocity of the door 18 is maintained for most of its travel within a certain range (e.g., ±25%) of that desired constant speed. It should be appreciated that the velocity may jump out of the desired range at certain instances during the door movement, such as during initial opening, towards the end of opening, during initial closing, towards the end of closing, and at the transition when the strut begins to compress (e.g., the "collapse point") during closing, and that the system subsequently brings the velocity back into the desired velocity range or profile.

Figure 21:
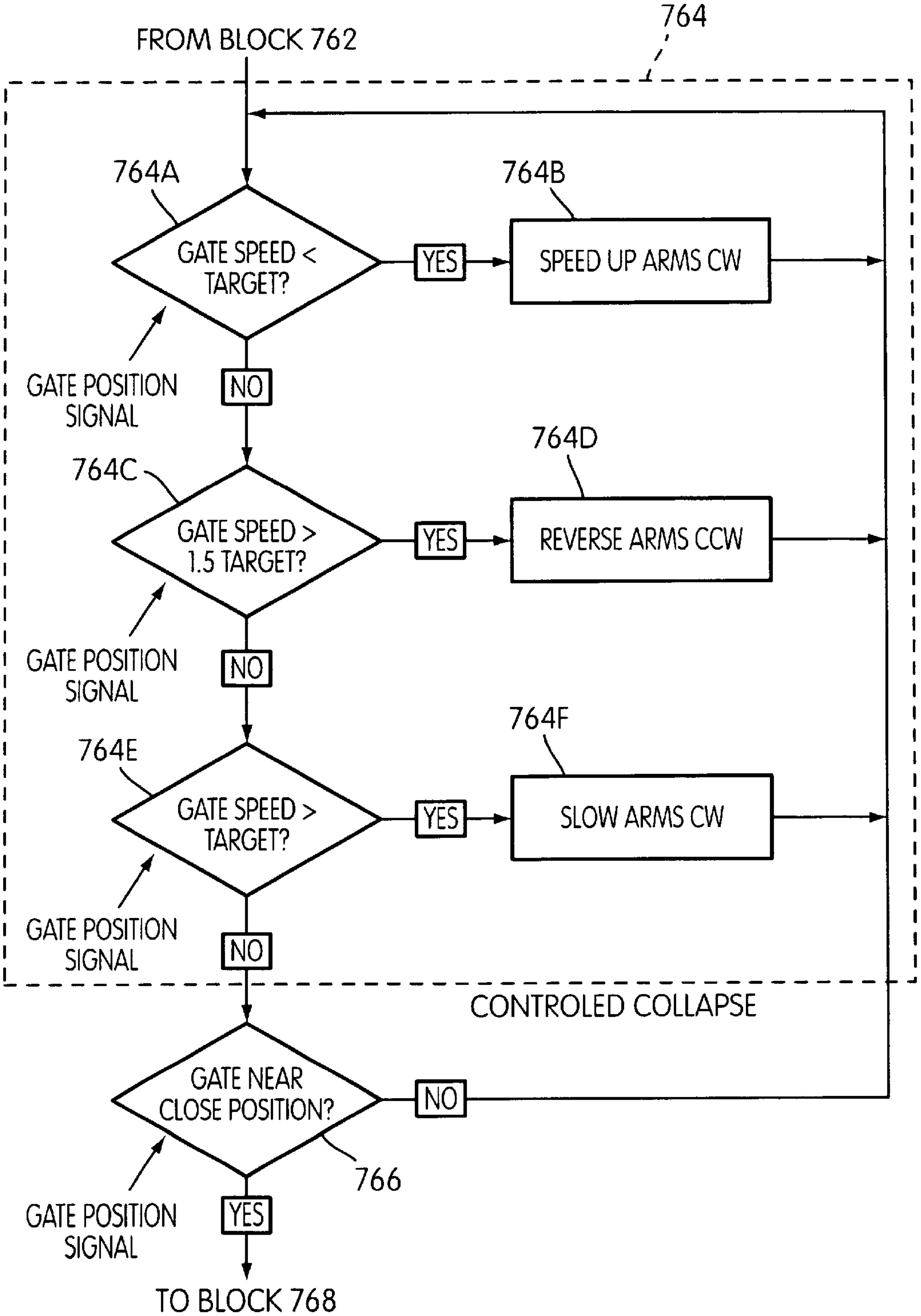
FIG. 21 is a flow diagram illustrating portions of the diagram of FIG. 20 in more detail.

Block 764 is shown in more detail in FIG. 21, a detailed schematic diagram. In task 764A, the control module 602 checks the speed of the door 18 and compares it with a target speed stored in memory. If the liftgate door speed is less than the target speed (task 764A: YES), control passes to task 764B, in which the control module 602 instructs the motor 135 to speed up the movement of the rotating arms 40. Control then returns to task 764A. If the speed of the liftgate door is not less than the target speed (task 764A: NO), control passes to task 764C.

In task 764C, the control module 602 determines whether the liftgate is moving more than 1.5 times the desired target speed. If the liftgate door is moving more than 1.5 times the desired target speed (task 764C: YES), it is assumed that slowing the rotating arms 40 is an insufficient speed correction. Control passes to task 764D in which the direction of movement of the rotating arms 40 is reversed. Otherwise (task 764C: NO), control passes to task 764E.

In task 764E, the control module 602 determines whether the liftgate door speed is greater than the target speed. If the liftgate door speed is greater than the target speed (task 764E: YES), control passes to task 764F, in which the control module 602 directs the motors 135 to slow the rotating arms 40. Control then returns to task 764A. If the liftgate door speed is not greater than the target speed (task 764E: NO), control passes directly to block 766.

In block 766, which is illustrated in FIGS. 20 and 21 for simplicity and clarity, the control module 602 determines whether the liftgate door 18 is close to the closed position. This determination is made based on the output of the liftgate position sensor 612. If the liftgate door is close to the closed position (block 766: YES), control passes to block 768. Otherwise, control returns to task 764A and block 764 repeats.

Returning to the high-level schematic flow diagram of FIG. 20, in FIG. 768, the control module 602 instructs the motor 135 to drive the rotating arms 40 in a counterclockwise direction at full speed, and the angular orientation of the struts 30 at this point in the cycle imparts a force (arrow F, in FIG. 9) to force the door 18 inward, causing the latch 24 to engage the latch striker 26. Control passes to block 770. In block 770, the control module 602 determines whether the latch assembly 22 has cinched. If the latch assembly 22 has cinched (block 770: YES), control passes to block 772. Otherwise (block 770: NO), control returns to block 768.

In block 772, the control module 602 instructs the motor 135 to drive the rotating arms 40 back to the "home" position. Control passes to block 774. In block 774, the control module 602 checks the "home" position sensors 616 to determine whether the rotating arms 40 have reached the "home" position. If the rotating arms 40 have reached the "home" position (block 774: YES), the liftgate door 18 is assumed to be fully closed, as shown in block 776, and algorithm 750 terminates and returns at block 778. Otherwise (block 774: NO), control returns to block 772.

In the description of algorithms 700 and 750 above, the control module 602 is programmed to repeat the task of a particular block if a later decision block demonstrates that the task of that particular block has not been performed successfully. In cases where repetitive failure to perform a task could indicate a persistent error condition (for example, in block 708 of algorithm 700 and block 758 of algorithm 758), the control module 602 may be programmed to abort operations if a the tasks of a block are unsuccessful after a specified number of iterations.

It will thus be seen that the objects of this invention have been fully and effectively accomplished. It will be realized, however, that the foregoing specific embodiments have been shown and described for the purpose of illustrating the functional and structural principles of this invention and are subject to change without departure from such principles. Therefore, this invention includes all modifications encompassed within the spirit of the following claims.

What is claimed is:

1. A powered closure drive mechanism for a vehicle, comprising:

a strut mountable between a frame of a vehicle and a closure pivotally connected to the frame, said strut having opposite ends moveable in opposite directions toward and away from one another, said strut being biased to move said ends away from one another, an angular orientation of said strut being adjustable between orientations in which the bias of the strut overcomes a weight of the closure so as to move the closure in a closure opening direction, and orientations in which the weight of the closure overcomes the bias of the strut so as to move the closure in a closure closing direction;

a motor assembly operatively coupled with said strut so as to adjust the angular orientation of the strut and thereby effect opening and closing of the closure;

a dynamic property detector that detects a dynamic property of the closure;

a controller operably connected with said motor and said dynamic property detector, said controller controlling said motor to adjust the angular orientation of the strut based upon information received from said dynamic property detector so as to maintain closure velocity within predetermined velocity limits.

2. The powered closure drive mechanism of claim 1, wherein said dynamic property detector comprises an inclinometer carried by the closure.

3. The powered closure drive system of claim 2, wherein said inclinometer is capable of detecting inclination of the vehicle and the closure, said inclinometer connected with said controller to enable the motor to adjust the orientation of the strut based on the inclination of at least one of said closure and said vehicle.

4. A powered closure drive system according to claim 3, wherein said inclinometer detects inclination of the closure when the closure is moving in a closure opening direction.

5. The powered closure drive mechanism of claim 1, wherein said dynamic property detector comprises an encoder operatively coupled to a pivotal connection connecting said closure to said frame.

6. The powered closure drive mechanism of claim 1, further comprising a strut orientation detector that sends a signal to said controller based upon an orientation of the strut.

7. The powered closure drive mechanism of claim 6, wherein the strut orientation detector comprises a Hall Effect sensor operatively associated with said motor.

8. The powered closure drive mechanism of claim 1, wherein said dynamic property detector comprises a velocity detector.

9. The powered closure drive mechanism of claim 1, wherein said controller comprises:

a central processing unit;

a memory storage unit operably connected to said central processing unit;

a plurality of inputs, at least one of which is connected to said dynamic property detector receiving feedback signals therefrom; and a plurality of outputs, at least one of which is connected to said motor transmitting control signals thereto, said central processing unit receiving said feedback signals and responsively generating said control signals in accordance with a control algorithm stored in said memory storage unit.

10. A powered closure drive mechanism for a vehicle, comprising:

a strut constructed and arranged to be mounted between a frame of a vehicle and a closure pivotally connected to the frame, said strut having first and second opposite ends moveable in opposite directions toward and away from one another, said strut being biased to move said ends away from one another, an angular orientation of said strut being adjustable between orientations in which the bias of the strut is sufficient to overcome a weight of the closure so as to move the closure in a closure opening direction, and orientations in which the weight of the closure is sufficient to overcome the bias of the strut so as to move the closure in a closure closing direction;

a motor operatively coupled with said strut so as to adjust the angular orientation of the strut by changing a position of the second end of the strut and thereby facilitate opening and closing of the closure;

a controller that controls said motor;

wherein said strut assumes a first orientation when said closure is fully opened and said strut assumes a second orientation when said closure is fully closed, and wherein a pivot point of the strut is moved by the motor when effecting opening and closing movement of the closure and is disposed in a same manual mode position when said strut is in either of said first and second orientations, enabling manual opening and closing of the closure.

11. The powered closure drive mechanism of claim 10, wherein said first end of the strut is pivotally connected to the closure and said second end of the strut is connected to said motor via an arm, said motor being fixed relative to said frame.

12. The powered closure drive mechanism of claim 10, further comprising an inclination detector that detects inclination of the vehicle, said inclination detector connected with said controller to adjust the orientation of the strut based on inclination of the vehicle.

13. A powered closure drive system mounted to the rearward-most pillar of a vehicle frame, comprising:

a strut constructed and arranged to be mounted between a frame of a vehicle and a closure pivotally connected to the frame, said strut having opposite ends moveable in opposite directions toward and away from one another, said strut being biased to move said ends away from one another, an angular orientation of said strut being adjustable between orientations in which the bias of the strut is sufficient to overcome a weight of the closure so as to move the closure in a closure opening direction, and orientations in which the weight of the closure is sufficient to overcome the bias of the strut so as to move the closure in a closure closing direction;

a motor operatively coupled with said strut so as to adjust the orientation of the strut and thereby facilitate opening and closing of the closure;

an arm connected to said motor and one end of said strut;

a controller operatively connected with said motor to control operation of said motor;

said motor mounted to the rearward-most pillar;

the pillar further comprising a longitudinal channel for receiving at least a portion of said arm and at least a portion of the strut.

14. The powered closure drive system of claim 13, wherein said motor is contained within the rearward-most pillar and provides a shaft extending into said longitudinal channel for connection with said arm.

15. The powered closure drive system of claim 13, wherein said motor provides a shaft extending through a portion of the rearward-most pillar and extending into said longitudinal channel for connection with said arm.

16. The powered closure drive system of claim 15, further comprising a panel constructed and adapted to cover said motor, said panel being disposed in an interior portion of the vehicle.

17. A powered closure drive system comprising:

a strut constructed and arranged to be mounted between a frame of a vehicle and a closure pivotally connected to the frame, said strut having opposite ends moveable in opposite directions toward and away from one another, said strut being biased to move said ends away from one another, an angular orientation of said strut being adjustable between orientations in which the bias of the strut is sufficient to overcome a weight of the closure so as to move the closure in a closure opening direction, and orientations in which the weight of the closure is sufficient to overcome the bias of the strut so as to move the closure in a closure closing direction;

a motor operatively coupled with said strut so as to adjust the angular orientation of the strut and thereby facilitate opening and closing of the closure;

a controller that controls said motor so as to control the angular orientation of the strut;

wherein said strut assumes a first orientation when said closure is fully opened and a second orientation when said closure is fully closed; and wherein when the closure approaches the fully closed position, the strut has an angular orientation wherein a line of action of said strut causes a closing force to be applied to said closure.

18. The powered closure drive system of claim 17, wherein said strut assumes a first orientation when said closure is fully open and a second orientation when said closure is fully closed, and wherein, during a movement from said first orientation toward said second orientation, said motor is moved such that the second end of said strut is positioned outwardly of a line of action defined between a hinge pivot axis of said closure and the pivotal strut connection with said closure at the first end of the strut so as to apply a closing force to said closure.

19. The powered closure drive system of claim 18, further comprising an arm having a first connecting structure adapted for connection to the first end of said strut and a second connecting structure adapted for connection to the output shaft of said motor.

20. A rear vehicle assembly of a motor vehicle comprising:

a frame defining an opening at the rear of the motor vehicle;

a closure constructed and arranged to fit in closed relation within said opening;

a hinge mounting said closure for pivotal movement between an open position and a closed position;

a latch assembly having cooperating parts mounted on said closure and said frame to releasably latch said closure in said closed position;

a strut operatively disposed between said frame and said closure and having opposite ends moveable in opposite directions toward and away from one another, said strut being biased when in first angular orientations thereof between the closure and the frame to move in one of said directions with sufficient force to overcome the weight bias of said closure and move said closure in a direction toward the open position thereof, said strut being moveable into second angular orientations thereof between the closure and the frame wherein the bias thereof is overcome by the weight of the closure and allows the closure to move in an opposite direction toward the closed position thereof; and a power operated system constructed and arranged to detect dynamic properties of said closure and including a motor operatively connected to said strut to change the angular orientation thereof responsive to the dynamic properties, said power operated system being operatively connected to said latch assembly to effect timely powered cinching and releasing of said latch assembly, said power operated system operable to change the angular orientation of said strut to move said strut between said first and second orientations to effect movement of said closure between the open position and said closed position thereof in accordance with said dynamic properties;

said power operated system operable to impart a closure closing force to said closure to move the closure into a latching relation when in said closed position.

21. The rear assembly of claim 20, wherein the dynamic properties comprise one or more members selected from the group consisting of closure position, closure velocity, closure acceleration, closure jerk, and closure inclination.

22. An automated, pivoted closure system, comprising:

a frame defining an opening;

a closure constructed and arranged to fit in closed relation within said opening;

a hinge mounting said closure for pivotal upward movement opposed to the weight bias of the closure toward an open position and for downward movement toward a closed position under the weight bias of the closure;

a resilient stored-energy member having first and second opposite ends moveable in opposite directions toward and away from one another, said resilient member having said first end thereof operatively connected with said closure, said resilient member being biased to move in one of said directions with sufficient force to overcome the weight bias of said closure and move said closure in a direction toward the open position thereof when connected between said frame and said closure in closure-raising relation and to be overcome by the weight bias of the closure and allow the closure to move in an opposite direction toward the closed position thereof when connected between said frame and said closure in closure-lowering relation;

a rotatable arm pivotally connected to the second end of said resilient member to change an angular orientation of said resilient member, thereby causing said resilient member to move between said closure-raising and closure-lowering relations; and a motor disposed in driving relation with said rotatable arm to effect rotational movement of said arm; and a controller that controls said motor to control an angular position of the rotatable arm and said angular orientation of said resilient member so as to control velocity of said closure when moving from at least said open position to said closed position.

23. The automated, pivoted closure system as claimed in claim 22 wherein when said closure is in said closed position thereof, said first end of the resilient stored-energy member is disposed lower than said second end of the resilient stored-energy member, and when said closure is in said open position thereof, said first end of the resilient stored energy member is disposed higher than said second end of the resilient stored energy member.

24. A method for controlling an automated, pivoted closure system, comprising:

providing a fixed structure, a pivotal structure mounted for pivotal movement about a horizontal axis and a biased first strut operably connected between said fixed structure and said pivotal structure, said first strut having opposite ends moveable in opposite directions toward and away from one another, said first strut being biased to move said ends away from one another, said strut first being adjustable between relative orientations between said fixed structure and said pivotal structure in which the bias of the first strut overcomes a weight of the pivotal structure so as to move the pivotal structure in an opening direction, and orientations in which the weight of the pivotal structure overcomes the bias of the first strut so as to move the pivotal structure in a closing direction;

measuring a dynamic property of said pivotal structure as it moves under the influence of the bias of the first strut and the gravitational forces of its weight; and controlling a motor to change the relative orientation of said first strut based upon said measured dynamic property of said pivotal structure so as to maintain the pivotal structure within a desired dynamic property profile.

25. The method of claim 24, wherein the dynamic property is selected from the group consisting of closure position, closure velocity, and closure acceleration.

26. The method of claim 24, wherein the method further comprises:

providing a second biased strut operably connected between said fixed structure and said pivotal structure, said second strut having opposite ends moveable in opposite directions toward and away from one another, said second strut being biased to move said ends away from one another, said second strut being adjustable between relative orientations between said fixed structure and said pivotal structure, said second strut connected on a side opposite to said first biased strut; and coordinating orientations of said first and second struts to effect movement of said pivotal structure.

27. The method of claim 24 wherein said method further comprises:

monitoring a region ahead of said pivotal structure as said pivotal structure moves in the closing direction; and if an obstacle is detected in said region, responsively controlling said motor to terminate movement of said pivotal structure.

28. The method of claim 24 wherein said method further includes controlling said motor to reverse movement of said pivotal structure after said motor terminates movement thereof.

* * * * *